US007751572B2

(12) United States Patent
Villemoes et al.

(10) Patent No.: US 7,751,572 B2
(45) Date of Patent: Jul. 6, 2010

(54) ADAPTIVE RESIDUAL AUDIO CODING

(75) Inventors: Lars Villemoes, Järfälla (SE); Francois Philippus Myburg, Eindhoven (NL)

(73) Assignees: Dolby International AB, Amsterdam (NL); Koninklijke Philips Electronics N.V., Eindhoven (NL)

( * ) Notice: Subject to any disclaimer, the term of this patent is extended or adjusted under 35 U.S.C. 154(b) by 1286 days.

(21) Appl. No.: 11/247,555

(22) Filed: Oct. 11, 2005

(65) Prior Publication Data

US 2006/0233379 A1 Oct. 19, 2006

Related U.S. Application Data

(60) Provisional application No. 60/671,581, filed on Apr. 15, 2005.

(51) Int. Cl.
*H04R 5/00* (2006.01)
*G06F 17/00* (2006.01)
*G10L 19/00* (2006.01)

(52) U.S. Cl. ............................ 381/23; 381/22; 700/94; 704/500; 704/501

(58) Field of Classification Search .................. 381/23, 381/22; 700/94; 704/500-501; 369/4-5, 369/86-92

See application file for complete search history.

(56) References Cited

U.S. PATENT DOCUMENTS 5,706,309 A 1/1998 Eberlein et al.
6,021,386 A 2/2000 Davis et al.
6,205,430 B1 3/2001 Hui
6,363,338 B1 * 3/2002 Ubale et al. .............. 704/200.1
7,292,901 B2 11/2007 Baumgarte et al.
7,359,522 B2 4/2008 Aarts et al.
7,437,299 B2 10/2008 Aarts et al.
2002/0067834 A1 6/2002 Shirayanagi
2005/0078832 A1 4/2005 Van De Par et al.
2006/0190247 A1 * 8/2006 Lindblom .................. 704/230

FOREIGN PATENT DOCUMENTS

EP 1376538 A1 1/2004

(Continued)

OTHER PUBLICATIONS

Johnston, et al.: "Sum-Difference Stereo Transform Coding", 0-7803-0532-9/92, 1992 IEEE, pp. 569-572.

(Continued)

*Primary Examiner*—Vivian Chin
*Assistant Examiner*—Douglas J Suthers
(74) *Attorney, Agent, or Firm*—Laurenece A. Greenberg; Werner H. Stemer; Ralph E. Locher

(57) ABSTRACT

An audio signal having at least two channels can be efficiently down-mixed into a downmixe signal and a residual signal, when the down-mixing rule used depends on a spatial parameter that is derived from the audio signal and that is post-processed by a limiter to apply a certain limit to the derived spatial parameter with the aim of avoiding instabilities during the up-mixing or down-mixing process. By having a down-mixing rule that dynamically depends on parameters describing an interrelation between the audio channels, one can assure that the energy within the down-mixed residual signal is as minimal as possible, which is advantageous in the view of coding efficiency. By post processing the spatial parameter with a limiter prior to using it in the down-mixing, one can avoid instabilities in the down- or up-mixing, which otherwise could result in a disturbance of the spatial perception of the encoded or decoded audio signal.

39 Claims, 14 Drawing Sheets

FOREIGN PATENT DOCUMENTS

| | | | |
|---|---|---|---|
| EP | 1 500 084 | B1 | 1/2008 |
| JP | 2002244698 | A | 8/2002 |
| JP | 2003330497 | A | 11/2003 |
| JP | 2005522721 | T | 7/2005 |
| JP | 2005522722 | T | 7/2005 |
| RU | 2129336 | C1 | 4/1999 |
| TW | 531986 | | 5/2003 |
| WO | 00/60746 | | 10/2000 |
| WO | 03069954 | A2 | 8/2003 |
| WO | 03/090208 | A1 | 10/2003 |
| WO | 03085643 | A1 | 10/2003 |
| WO | 03085645 | A1 | 10/2003 |

OTHER PUBLICATIONS

Breebaart, et al.: “High-Quality Parametric Spatial Audio Coding at Low Bit Rates”, AES 116$^{th}$ Convention, Berlin, Germany, May 8-11, 2004, pp. 1-13.

Werner Oomen, et al.: “MPEG4-Ext2: CE on Low Complexity parametric stereo”—ISO/IEC JTC1/SC29/WG11-MPEG2003/M10366, Coding of Moving Pictures and Audio, International Organisation for Standardisation- Hawaii, USA, Dec. 2003, pp. 4, 5, 30-31, 35, 37.

Faller, Christof: “Parametric Coding of Spatial Audio”—Thesis No. 3062, These Presentee a la Faculte Informatique et Communications Institute des Systemes de Communication Ecole Polytechnique Federale de Lausanne pour L’Obtention du Grade de Docteur es Sciences-Lausanne, France, 2004, pp. 1-164.

Technical Specification: “Universal Mobile Telecommunications System (UMTS); General audio codec audio processing functions ; Enhanced aacPlus general audio codec; Encoder specification; parametric stereo part (3GPP TS 26.405 version 6.1.0 Release 6), ETSI TS 126 405”, ETSI Standards, European Telecommunications Standards Institute, Sophia- Antio, FR, vol. 3-SA4, No. 610, Mar. 2005.

* cited by examiner

ADAPTIVE RESIDUAL AUDIO CODING

CROSS-REFERENCE TO RELATED APPLICATION

This application claims the priority, under 35 U.S.C. §119(e), of provisional application No. 60/671,581, filed Apr. 15, 2005; the prior application is herewith incorporated by reference in its entirety.

BACKGROUND OF THE INVENTION

Field of the Invention

The present invention relates to the encoding and decoding of audio signals and in particular to the efficient high-quality coding of a pair of audio channels.

Recently, effective high-quality coding of audio signals has become more and more important, as digital distribution of compressed audio and video content, e.g. by satellite or by terrestrial digital audio- or video-broadcasting is widely used. The well-known MP3 technique, for example, allows for convenient transmission of audio titles over the internet or other transmission channels having limited bandwidths.

In addition to MP3, several other audio coding schemes aim to maximize the audio quality for a given compression ratio or bit rate. It has been shown in "Efficient and scalable Parametric Stereo Coding for Low Bit rate Audio Coding Applications", PCT/SE02/01372, that it is possible to recreate a stereo signal that closely resembles the underlying original stereo image, from a mono signal when additionally a very compact representation of the stereo signal commonly referred to as "spatial cues" is used. The disclosed principle is to divide the stereo input signal into frequency bands and to estimate parameters called inter-channel intensity difference (IID) and inter-channel coherence (ICC) for each of the frequency bands separately. The first parameter describes a measurement of the power distribution between the two channels in the specific frequency band and the second parameter describes an estimation of the correlation between the two channels. A more thorough description of spatial parameters may be found in "High-quality parametric spatial audio coding at low bit rates" J. Breebaart, S. van de Par, A. Kohlrausch and E. Schuijers, Proc. 116$^{th}$ AES Convention, Berlin (Germany), May 8-11, 2004. Based on these spatial cues, the stereo input signal is adaptively combined into a mono signal. Both the spatial cues and the mono signal are coded and the coded representation is multiplexed into a bit-stream, that is transmitted to the decoder. On the decoder side the stereo image is recreated from the mono signal by distributing the energy of the mono signal between the two output channels in accordance with the IID-data, and by adding a decorrelated signal in order to retain the channel correlation of the original stereo channels, as it is described by the IIC parameters.

When more transmission bandwidth is available, a higher audio quality can be achieved by replacing the decorrelated mono-signal in the decoder by a transmitted residual signal. That is, the transmission of an additional residual signal to a decoder is required. This is also the case with mid-side (MS) coding, where the sum and the difference of the channels of a stereo signal are coded rather than the left and right channels directly. A description of the MS technique may be found in "Sum-difference stereo transform coding", Proc. Int. Conf. Acoust. Speech Signal Process. (ICASSP), San Francisco, USA, 1992, pp. II 569-572. MS coding is based on the finding, that the left and the right channel of a stereo signal are being rather similar with a high probability. Therefore, a difference of the left and the right channel will yield a signal having a comparatively low intensity most of the time, i.e. the amplitude of the difference signal will be rather small. Hence, one can save a significant amount of bit rate when encoding the difference signal, since the parameters describing the difference signal can be coarsely quantized. The sum signal will evidently need about the same bandwidth than a single left or right channel, when encoded. Therefore, one can save a significant amount of bandwidth in total when using the MS coding scheme. When a large intensity difference between the left and the right channel exists, the MS technique has its limits, since then also the difference channel will contain a substantial amount of energy and therefore needs a higher bandwidth. It may be noted, however, that in regular stereo-coded implementations, MS coding will not be applied in this case, due to high encoding costs. In those cases, it is advantageous to have the possibility to switch between normal stereo coding and MS coding, depending on the intensity carried by the original audio channels that have to be encoded.

By replacing the static concept of building the sum and the difference of two stereo channels that are to be encoded by inventing a decoder rotator matrix with matrix elements that describe the composition of two intermediate channels that are a combination of the two stereo channels, one can overcome the above problem. The matrix elements are depending on parametric stereo parameters that are extracted from the left and the right channel of the stereo signal. Adaptive residual coding is such able to dynamically adapt the combination rule for the generation of intermediate channels to the properties of the present signal, achieving a significant performance gain over MS coding.

Choosing a suited dependency of the matrix elements of the so-called rotator matrix from the parametric stereo parameters, one can achieve that the energy within a difference channel stays as minimal as possible, as shown already within the non-disclosed European patent application EP 04103168.3. As one introduces a rotator matrix to transform (downmix or up-mix) the stereo signal to signals m and s (the intermediate signals, i.e. the downmix signal m and residual-signal s), it is crucial for the operation of the method that the rotator matrices (the decoder rotator matrix and the encoder rotator matrix) are bounded. This means that the matrix elements within the matrices do not diverge to infinity within the entire range of parametric stereo coding parameters possible. In other words, both rotator matrices have to be bounded in the sense that the matrix condition number is sufficiently small to allow problem-free matrix inversion for the entire range of parametric stereo coding parameters, which is not the case for implementations according to prior art techniques.

SUMMARY OF THE INVENTION

It is the object of the present invention to provide a concept for high quality audio coding yielding a highly compressed representation of an audio signal simultaneously avoiding artefacts introduced by the coding or decoding more efficiently.

According to a first aspect of the present invention, this object is achieved by an audio encoder for encoding an audio signal having at least two channels, comprising: a parameter extractor for deriving a spatial parameter from the audio signal, wherein the spatial parameter describes an interrelation between the at least two channels; a limiter for limiting the spatial parameter using a limiting rule to derive a limited spatial parameter, wherein the limiting rule depends on an interrelation between the at least two channels; and a down-mixer for deriving a downmix signal and a residual signal from the audio signal using a down-mixing rule depending on the limited spatial parameter.

According to a second aspect of the present invention, this object is achieved by an audio decoder for decoding an encoded audio signal representing an original audio signal having at least two channels, the encoded audio signal having a downmix signal, a residual signal and a spatial parameter describing an interrelation between the at least two channels, comprising:

a limiter for limiting the spatial parameter to derive a limited spatial parameter using a limiting rule, wherein the limiting rule depends on an interrelation between the at least two channels; and an up-mixer for deriving a reconstruction of the original audio signal from the downmix signal and the residual signal using an up-mixing rule depending on the limited spatial parameter.

According to a third aspect of the present invention, this object is achieved by a method for encoding an audio signal having at least two channels, the method comprising: deriving a spatial parameter from the audio signal, wherein the spatial parameter describes an interrelation between the at least two channels; limiting the spatial parameter using a limiting rule to derive a limited spatial parameter, wherein the limiting rule depends on an interrelation between the at least two channels; and deriving a downmix signal and a residual signal from the audio signal using a down-mixing rule depending on the limited spatial parameter.

According to a fourth aspect of the present invention, this object is achieved by a method for decoding an encoded audio signal representing an original audio signal having at least two channels, the encoded audio signal having a downmix signal, a residual signal and a spatial parameter describing an interrelation between the at least two channels, the method comprising: limiting the spatial parameter to derive a limited spatial parameter using a limiting rule, wherein the limiting rule depends on an interrelation between the at least two channels; and deriving a reconstruction of the original audio signal from the downmix signal and the residual signal using an up-mixing rule depending on the limited spatial parameter.

According to a fifth aspect of the present invention, this object is achieved by a transmitter or audio recorder having an audio encoder for encoding an audio signal having at least two channels, comprising: a parameter extractor for deriving a spatial parameter from the audio signal, wherein the spatial parameter describes an interrelation between the at least two channels; a limiter for limiting the spatial parameter using a limiting rule to derive a limited spatial parameter, wherein the limiting rule depends on an interrelation between the at least two channels; and a down-mixer for deriving a downmix signal and a residual signal from the audio signal using a down-mixing rule depending on the limited spatial parameter.

According to a sixth aspect of the present invention, this object is achieved by a receiver or audio player, having an audio decoder for decoding an encoded audio signal representing an original audio signal having at least two channels, the encoded audio signal having a downmix signal, a residual signal and a spatial parameter describing an interrelation between the at least two channels, comprising: a limiter for limiting the spatial parameter to derive a limited spatial parameter using a limiting rule, wherein the limiting rule depends on an interrelation between the at least two channels; and an up-mixer for deriving a reconstruction of the original audio signal from the downmix signal and the residual signal using an up-mixing rule depending on the limited spatial parameter.

According to a seventh aspect of the present invention, this object is achieved by a method of transmitting or audio recording the method having a method of generating an encoded signal, the method comprising a method for encoding an audio signal having at least two channels, the method comprising: deriving a spatial parameter from the audio signal, wherein the spatial parameter describes an interrelation between the at least two channels;

limiting the spatial parameter using a limiting rule to derive a limited spatial parameter, wherein the limiting rule depends on an interrelation between the at least two channels;

deriving a downmix signal and a residual signal from the audio signal using a down-mixing rule depending on the limited spatial parameter.

According to an eighth aspect of the present invention, this object is achieved by a method of receiving or audio playing, the method having a method for decoding an encoded audio signal, the method comprising a method for decoding an encoded audio signal representing an original audio signal having at least two channels, the encoded audio signal having a downmix signal, a residual signal and a spatial parameter describing an interrelation between the at least two channels, the method comprising: limiting the spatial parameter to derive a limited spatial parameter using a limiting rule, wherein the limiting rule depends on an interrelation between the at least two channels; and deriving a reconstruction of the original audio signal from the downmix signal and the residual signal using an up-mixing rule depending on the limited spatial parameter.

According to a ninth aspect of the present invention, this object is achieved by a transmission system having a transmitter and a receiver, the transmitter having an audio encoder for encoding an audio signal having at least two channels, comprising: a parameter extractor for deriving a spatial parameter from the audio signal, wherein the spatial parameter describes an interrelation between the at least two channels; a limiter for limiting the spatial parameter using a limiting rule to derive a limited spatial parameter, wherein the limiting rule depends on an interrelation between the at least two channels; and a down-mixer for deriving a downmix signal and a residual signal from the audio signal using a down-mixing rule depending on the limited spatial parameter; and the receiver having an audio decoder for decoding an encoded audio signal representing an original audio signal having at least two channels, the encoded audio signal having a downmix signal, a residual signal and a spatial parameter describing an interrelation between the at least two channels, comprising: a limiter for limiting the spatial parameter to derive a limited spatial parameter using a limiting rule, wherein the limiting rule depends on an interrelation between the at least two channels; and an up-mixer for deriving a reconstruction of the original audio signal from the downmix signal and the residual signal using an up-mixing rule depending on the limited spatial parameter.

According to a tenth aspect of the present invention, this object is achieved by a method of transmitting and receiving, the method including a transmitting method having a method of generating an encoded signal of an audio signal having at least two channels, the method comprising: deriving a spatial parameter from the audio signal, wherein the spatial parameter describes an interrelation between the at least two channels; limiting the spatial parameter using a limiting rule to derive a limited spatial parameter, wherein the limiting rule depends on an interrelation between the at least two channels; and deriving a downmix signal and a residual signal from the audio signal using a down-mixing rule depending on the limited spatial parameter; and a receiving method, having a method for decoding an encoded audio signal, the method comprising: limiting the spatial parameter to derive a limited spatial parameter using a limiting rule, wherein the limiting rule depends on an interrelation between the at least two channels; and deriving a reconstruction of the original audio signal from the downmix signal and the residual signal using an up-mixing rule depending on the limited spatial parameter.

According to an eleventh aspect of the present invention, this object is achieved by an encoded audio signal being a representation of an audio signal having at least two channels, the encoded audio signal having a spatial parameter describing an interrelation between the at least two channels, a downmix signal and a residual signal, wherein the downmix signal and the residual signal are derived from the audio signal using a down-mixing rule depending on a limited spatial parameter derived using a limiting rule depending on an interrelation of the at least two channels.

The present invention is based on the finding that an audio signal having at least two channels can be efficiently downmixed into a downmix signal and a residual signal, when the down-mixing rule used depends on a spatial parameter that is derived from the audio signal and that is post-processed by a limiter to apply a certain limit to the derived spatial parameter with the aim of avoiding instabilities during the up-mixing or down-mixing process. By having a down-mixing rule that dynamically depends on parameters describing an interrelation between the audio channels, one can assure that the energy within the down-mixed residual signal is as minimal as possible, which is advantageous in the view of coding efficiency. By post processing the spatial parameter with a limiter prior to using it in the down-mixing, one can avoid instabilities in the down- or up-mixing, which otherwise could result in a disturbance of the spatial perception of the encoded or decoded audio signal.

In one embodiment of the present invention, an original stereo signal having a left and a right channel is supplied to a down-mixer and a parameter extractor. The parameter extractor derives the commonly known spatial parameters ICC (Inter-Channel-Correlation) and IID (Inter-Channel-Intensity Difference). The down-mixer is able to downmix the left and right channels into a downmix signal and a residual signal, wherein the down-mixing rule is such that the resulting residual signal carries minimum achievable energy. Therefore, subsequent compression of the resulting residual signal by a standard audio encoder will result in an extremely compact code. This can be achieved by formulating the down-mixing rule in dependence of the spatial parameters ICC and IID, since both of the parameters are describing intensity- or amplitude ratios of the original stereo channels. A general problem during encoding is energy preservation. It is necessary that both the original signal and the encoded signal contain the same energy, since a violation of the energy conservation would result in a different loudness perception of the encoded signals or even in uncontrollable jumps in the loudness of the encoded signal. Therefore, in the above encoding scheme the downmix signal and the residual signal have to be scaled by a scaling factor that ensures the energy conservation rule.

If the original audio signal that is to be encoded has special properties, this scaling factor can diverge, in particular when the left and the right original channel are perfectly anti-correlated, i.e. when they have the same amplitudes and a phase shift of precisely 180. This instability is avoided within the inventive concept by applying a limiting function to the ICC parameter, wherein the limiting function depends on a maximum acceptable scaling factor and the IID parameter. To avoid a possible divergence, the rule that describes the down mixing is altered directly, whereas in state of the art implementations the scaling factor is simply limited by setting a threshold and where the scaling factor is replaced by the threshold value when exceeding the threshold.

It is a big advantage of the inventive concept, that both the signal within the downmix channel and the residual channel is altered through altering the parameters that are underlying the down-mixing process. Only the signal in the downmix channel would be influenced when applying a threshold according to prior art, thus a better preservation of the inter-relation between the original left and right channel can be achieved when following the inventive concept.

Another advantage of the concept described above is, that the spatial parameters used are generally derived during an encoding process. Therefore one can implement the necessary limiting logic without having to introduce new parameters.

In a further embodiment of the present invention a limiter is applied at the decoder side, having the same limiting rule than a limiter on the encoder side. This means that on the decoder side, the downmix and the residual signal as well as the spatial parameters IID and ICC are received, and the received spatial parameters are limited using the same limiting rule used during the encoding process. The up-mixing is then dependent on the limited spatial parameters, assuring for a non-occurring divergence in the up-mixing process. The advantage of having the same limiting rules in the encoding and the decoding is obvious, since one only has to develop hardware circuits or an implementation of a software algorithm once. Hard- or Software having as well encoding as decoding functionality, can be developed at lower costs, since one is able to reuse the same hard- or software for the limiting functionality.

In a further embodiment of the present invention, the down-mixed signals and the spatial parameters are compressed after their generation, yielding two audio bit streams for the down-mixed signals and a parameter bit stream holding the compressed spatial parameters. This reduces the size of the encoded representation to be transmitted, further saving bandwidth, wherein the encoding may be lossy or lossless, since the encoding rule itself is independent of the inventive concept. An inventive decoder according to the inventive concept then comprises a decompression stage, where the compressed representations are decompressed into the spatial parameters, the down-mixed channel and the residual channel prior to up-mixing.

In another embodiment of the present invention, the already compressed audio bit streams and the parameter bit stream are combined into a combined bit stream, e.g. by multiplexing, allowing for a convenient storage of a generated file on a storage medium. This also allows for streaming applications, for example, streaming the encoded content via the internet, since all the relevant information is comprised in one single file or bit stream, allowing for a more convenient handling than in a case, where three separate bit streams would be transferred. The corresponding inventive decoder then has a decombination stage, which could for example be a demultiplexer to decombine the bit stream into three separate bit streams, namely the two audio bit streams and the parameter bit stream.

It is to be noted here that the inventive concept provides a perfect backward-compatibility to prior art residual coding, where the spatial parameters are not limited and even to prior art parametric stereo coding, where a decoder does not make use of the residual signal. This is of course a major advantage, since newly encoded audio data can be reproduced with maximum possible quality by inventive decoders, whereas it may also be reproduced already existing decoders according to prior art.

In a further embodiment of the present invention, three inventive encoders are combined to encode a multi-channel audio signal comprising six individual channels, wherein each of the three inventive encoders encodes a pair of channels, deriving spatial parameters, a downmix and a residual signal for each of the channel pairs. The inventive concept can thereby also be used to encode multi-channel audio signals where the efficiency of the coding and the compactness of the resulting representation has an even higher priority, since the total amount of data to be encoded and transmitted is much higher than for a stereo signal. In principle, an arbitrary number of inventive audio encoders can be combined to simultaneously encode a multi-channel audio signal having basically any number of single audio channels. In a further embodiment of the multi-channel audio encoder, the individual downmix signals and residual signals as well as the individual parameter bit streams are combined by a 3 to 2 down-mixer to receive a common left signal, a common right signal, and a common residual signal and a combined parameter bit stream, further reducing the amount of required bandwidth. The corresponding decoders straightforwardly comprise a 2 to 3 up-mixer stage then.

In another embodiment of the present invention, a transmitter or audio recorder is comprising an inventive encoder, allowing for compact, high-quality audio recording or transmitting, wherein the size of the transmitted or stored audio content can be significantly reduced. Such audio content can be stored on a storage medium of a given capacity or less bandwidth is used during transmission of the audio signal.

In another embodiment a receiver or audio player is having an inventive decoder, allowing for streaming applications in limited bandwidth environments such as mobile phones or allowing for construction of small portable play-back devices, using storage media of limited capacity.

A combination of an inventive transmitter and receiver yields a transmission system, allowing conveniently transmitting audio content via wired or wireless transmission interfaces, such as wireless LAN, Bluetooth, wired LAN, power line technologies, radio transmission, or any other type of data transmission.

BRIEF DESCRIPTION OF THE DRAWINGS

Preferred embodiments of the present invention are subsequently described by referring to the enclosed drawings, wherein.

DETAILED DESCRIPTION OF THE PREFERRED EMBODIMENTS

Figure 1:
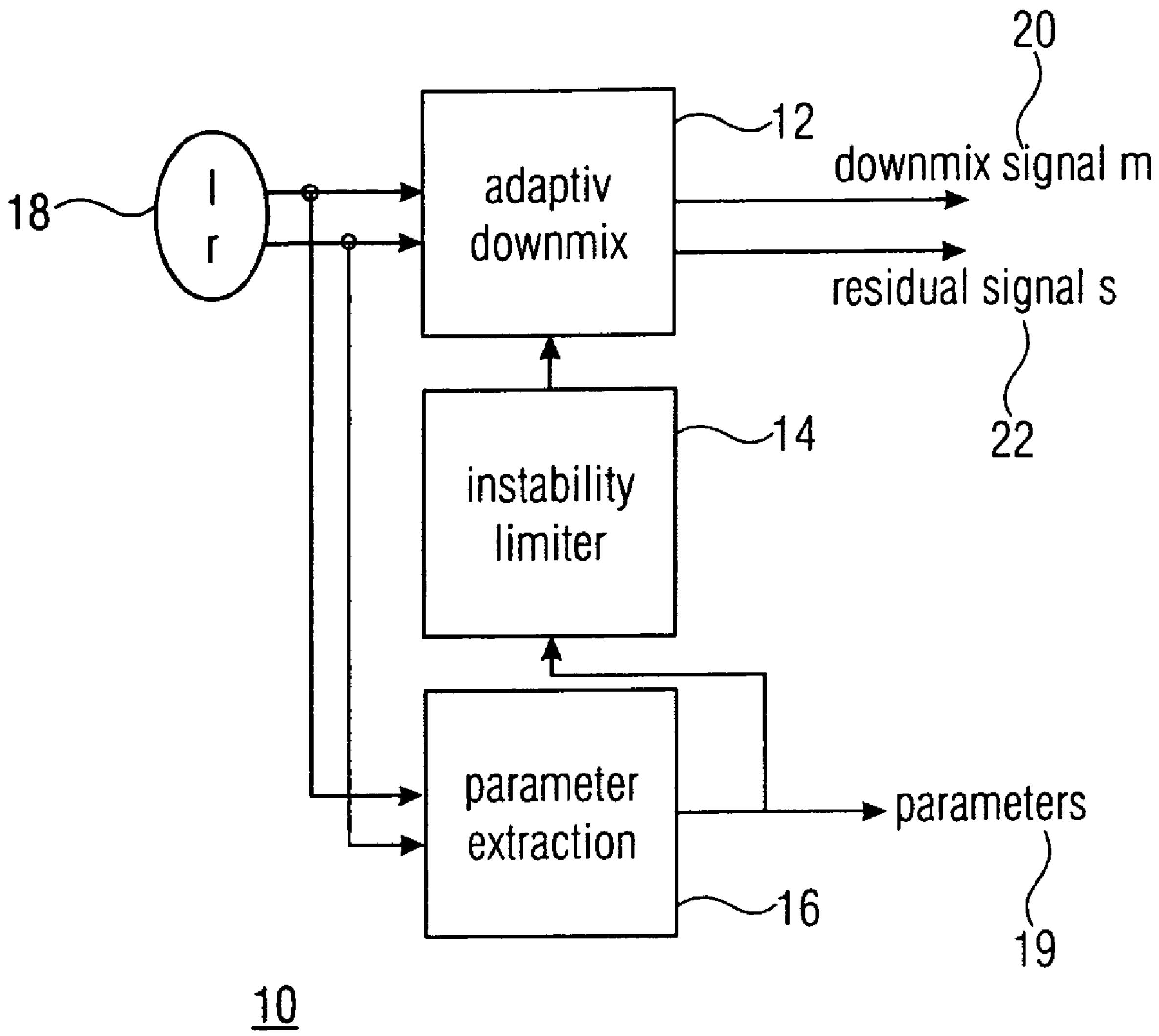
FIG. 1 shows a block diagram of an inventive encoder.

FIG. 1 shows a block diagram of an inventive audio encoder 10, comprising a down-mixer 12, a limiter 14, and a parameter extractor 16.

A stereo signal 18, having a left and a right channel, is input into the down-mixer 12 and into the parameter extractor 16 simultaneously. The parameter extractor 16 extracts spatial parameters 19 describing an interrelation between the left and the right channel of the stereo signal 18. These parameters are on the one hand made available for transmission and on the other hand input into the limiter 14. The limiter 14 applies a limiting rule to the parameters. The details of an appropriate limiting rule shall be derived in the following paragraphs.

The limiter derives limited spatial parameters and these are input into the down-mixer 12, wherein the down-mixer 12 applies a down-mixing rule to the left and right channel of the stereo signal 18 to derive a downmix signal 20 and a residual signal 22 from the left and the right channel of the stereo signal. The down-mixing rule is additionally depending on the limited spatial parameter.

When choosing an appropriate limiting rule for the limiter, the down-mixer 12 is only supplied with limited parameters that are limited in a way that the down-mixing rule does not diverge or produce any output that is deteriorating a spatial interrelation of the left and the right channel because of the down-mixing.

As a result, the stereo signal 18 is represented by the downmix signal 20, the residual signal 22, and the spatial parameters 19 after the encoding process performed by the audio encoder 10.

To understand how a down-mixing rule and a limiting rule have to interrelate to provide a resulting residual signal 22 containing minimal feasible energy while simultaneously limiting a spatial parameter such that the down-mixing rule does not cause any divergences, the basic concept underlying the present invention is elaborated in more detail in the following few paragraphs.

The parameters extracted by the parameter extractor 16 typically result from a single time and frequency interval of sub-band samples from a complex modulated filter bank analysis of discrete time signals. That means that the audio signal of the left and right channel of the stereo signal 18 is first divided into time frames of a given length, and within a single time frame, the frequency spectrum is sub-divided into a number of sub-band samples. For each single sub-band, the parameter extractor 16 then derives a spatial parameter by comparing the left and right channels of the stereo signal within the sub-band of interest. Therefore, the left and the right channel of the stereo signal 18 and the downmix signal m and the residual signal s from FIG. 1 have to be understood as discrete and finite length vectors, describing the underlying signals within a discrete time interval. As mentioned above, during a down-mixing, energy preservation must be assured. For discrete complex vectors x, y, the complex inner product and squared norm (comparable to energy) is defined by $$\left\{\begin{array}{l} \langle x, y\rangle = \sum_n x(n)y^*(n), \\ X = \|x\|^2 = \langle x, x\rangle = \sum_n |x(n)|^2, \\ Y = \|y\|^2 = \langle y, y\rangle = \sum_n |y(n)|^2, \end{array}\right\}. \tag{1}$$

Following the normal convention, a * denotes complex conjugation. From here on, upper case letters describe the squared sum or energy, of the corresponding finite length complex vectors denoted by lower case letters.

According to the present invention, the downmix channel m resulting from the adaptive downmix is the energy weighted sum of the original left and right channel, and thus defined by $$m=g\cdot(l+r), \tag{2}$$

where g is a real and positive gain factor adjusted such that the energy of the downmix (M) equals the sum of energies of the left (L) and (R) channel signal vectors (M=L+R).

As this gain factor diverges to infinity when l and r are out of phase and have comparable energy (i.e. l+r=0 in equation No. 2), it is necessary to limit this factor by a maximal gain factor $g_0$ that is typically within the interval [1,2]. The parameter extractor 16, as shown in FIG. 1, extracts the spatial audio parameters IID (Interchannel Intensity Difference) and ICC (Interchannel Coherence) that are represented here by $$c = \sqrt{\frac{L}{R}},\ \rho = \frac{\mathrm{Re}\langle l, r\rangle}{\sqrt{L \cdot R}}. \tag{3}$$

Here, c denotes the IID-parameter and ρ denotes the ICC-parameter. The gain factor g can be expressed depending on the ICC and IID parameters and such the required limitation of the gain factor can be written as follows:

$$g = \min\left\{g_0,\ \sqrt{\frac{c^2+1}{c^2+1+2\rho c}}\right\}. \tag{4}$$

Generally, since $|\rho| \leqq 1$, we have $2\rho c \leqq c^2+1$, such that $1/\sqrt{2} \leqq g \leqq g_0$.

To achieve maximum coding efficiency, it is desired that the energy within the residual signal 22 is minimal. The following derivation solves a more general optimization problem comprising an additional residual signal t, which then turns out to be superfluous due to (9). Considering the problem from the decoder side, one needs to determine gains a, b, such that the residual signals s, t in the up-mix $$\left\{\begin{array}{l} l = a \cdot m + s \\ r = b \cdot m + t \end{array}\right\} \tag{5}$$

have minimal energy. The solution is given by $$(a, b) = \left(\frac{1+p}{2g}, \frac{1-p}{2g}\right), \tag{6}$$

where $$p = \frac{\langle l - r, l + r\rangle}{\|l + r\|^2}. \tag{7}$$

The same problem, with the additional restriction that the coefficients a,b are real, has the solution given by taking the real part of (7) and inserting it in (6). In this case, ρ can be expressed in terms of the PS parameters c,ρ, as follows:

$$p = \frac{c^2 - 1}{c^2 + 1 + 2\rho c}. \tag{8}$$

By inserting (6) into (5) and adding the two equations in (5) it follows that:

$$t = -s. \tag{9}$$

Describing the up-mixing process in the usual matrix notation, the up mixing can be represented by a rotator matrix H as follows:

$$\begin{bmatrix} l \\ r \end{bmatrix} = H\begin{bmatrix} m \\ s \end{bmatrix} = \begin{bmatrix} a & 1 \\ b & -1 \end{bmatrix}\begin{bmatrix} m \\ s \end{bmatrix}. \tag{10}$$

In the case where g is not limited by $g_0$ in (4), a different representation of the optimal coefficients a, b is given by:

$$\left\{\begin{array}{l} a = c_l \cos(\alpha + \beta) \\ b = c_r \cos(-\alpha + \beta) \\ \alpha = \frac{1}{2}\cos^{-1}\rho,\ \beta = \tan^{-1}\left(\tan(\alpha)\frac{c_r - c_l}{c_r + c_l}\right) \\ c_l = \frac{c}{\sqrt{1+c^2}},\ c_r = \frac{1}{\sqrt{1+c^2}} \end{array}\right\}. \tag{11}$$

The first column of the rotator matrix H is identical to the amplitude rotator used in parametric stereo, that is for example derived in WO 03/090206 A1.

The downmix needs to be compatible with the up mix in the sense that perfect reconstruction is obtained when all lossy coding steps are omitted. As a consequence the down-mixing matrix D, $$\begin{bmatrix} m \\ s \end{bmatrix} = D\begin{bmatrix} l \\ r \end{bmatrix}, \tag{12}$$

must be the inverse of the upmix rotator H. An elementary computation yields $$D = \begin{bmatrix} g & g \\ \frac{1-p}{2} & \frac{-1-p}{2} \end{bmatrix}, \tag{13}$$

where the first row is consistent with (2).

There is a stability problem with the two optimal rotators given by (10) and (13). As (c,ρ) approaches (1,−1), the value of ρ given by (8) diverges. Therefore one has to deviate from the optimal rotators in a neighborhood of this point of the PS parameter domain. The solution taught by the present invention is to modify the PS parameters by an instability limiter both in the encoder and in the decoder.

In its general form, such a limiter will alter the values of the pair (c,ρ) in a neighborhood of (1,−1) in order to achieve a bounded range for p. A particularly attractive solution is based on the observation that the denominator of (8) is the same as that of (4). The inventive solution keeps c unaltered and modifies ρ exactly when the adaptive downmix gain g is limited by $g_0$ in (4). This occurs when $$\rho < \rho_0(c) = \frac{1}{2}\left(\frac{1}{g_0^2} - 1\right)\left(c + \frac{1}{c}\right). \tag{14}$$

The preferred modification of ρ performed by the instability limiter 14 is then:

$$\rho \mapsto \tilde{\rho} = \max\{\rho, \rho_0(c)\}. \tag{15}$$

The corresponding value of p given by inserting $\tilde{\rho}$ in place of ρ in (8) has the property that $$|\tilde{p}| \leq g_0^2 \frac{|c^2-1|}{c^2+1} \leq g_0^2. \tag{16}$$

In the previous paragraphs, the problem analysis leading to the definition of the limiter 14 has been detailed. Although the notation is based on stereo signals, it is clear that the same method can be applied on any pair of audio signals, such as channel pairs selected from or generated by a partial down-mix of a multi-channel audio signal. Particularly advantageous is, that the same limiting rule can be used to limit the parameters within the up-mixing and the down-mixing matrix.

Figure 2:
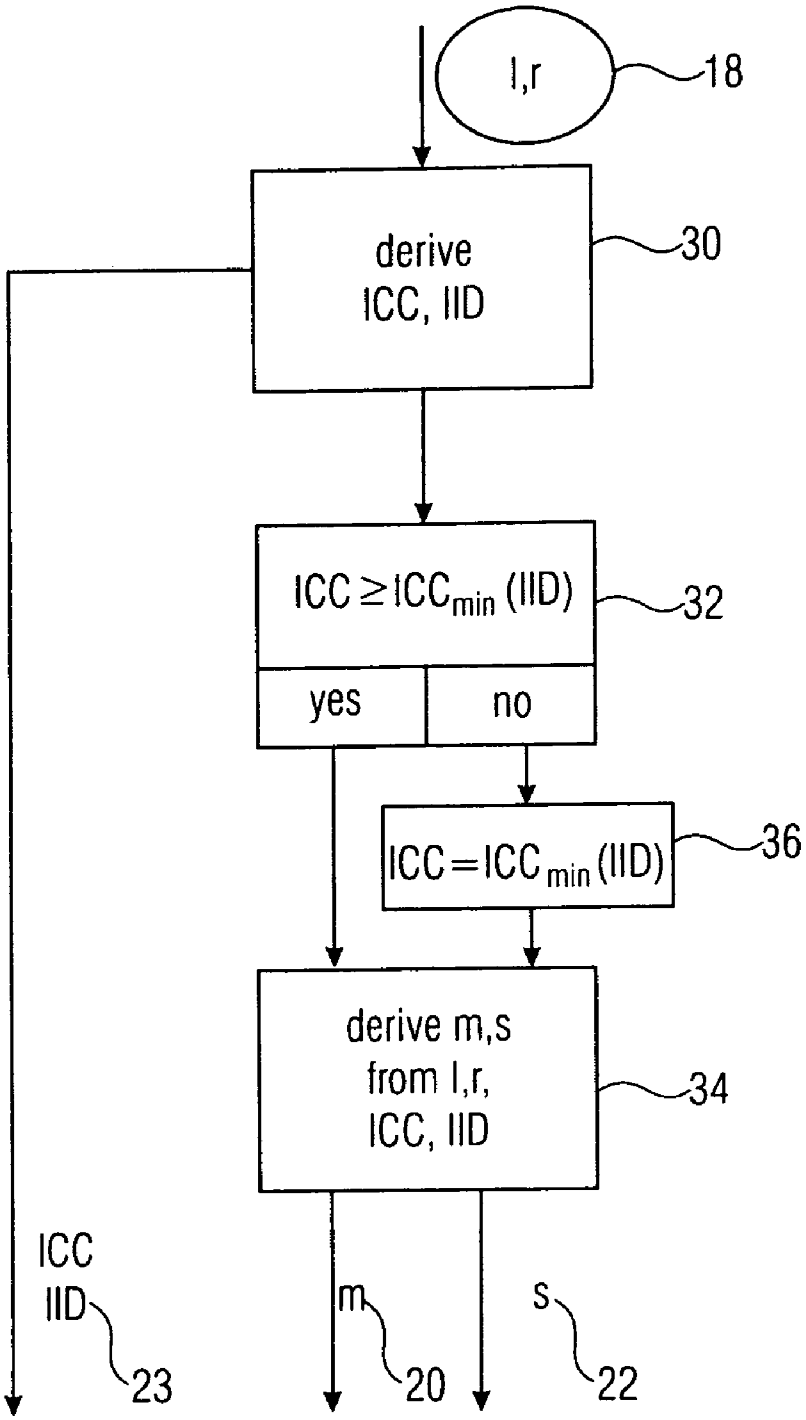
FIG. 2 shows a block diagram of the inventive encoding principle.

FIG. 2 describes the inventive audio encoding procedure using a block diagram, showing how the audio encoding is performed when following the inventive concept. In a first parameter extraction step 30, the ICC and IID parameters are derived.

These parameters are then forwarded as output 23 and transferred to serve as input for the limiting step 32, where a comparison of the ICC parameter with a computed minimal ICC parameter $ICC_{min}$ is made, wherein $ICC_{min}$ is depending on IID. In a first case, where the ICC parameter excedes the minimum ICC parameter $ICC_{min}$(IID), the ICC parameter is directly forwarded to the down-mixing step 34.

If the ICC parameter does not exceed $ICC_{min}$(IID), an additional exchange step 36 is performed, where the value of the ICC parameter is replaced by the value of the minimal ICC parameter $ICC_{min}$(IID). After the exchange step 36, the ICC parameter having the new value is then transferred to the down-mixing step 34.

In the down-mixing step 34 the downmix signal 20 and the residual signal 22 are derived from the channels l and r, depending on the parameters ICC and IID.

Finally the parameters 23 (ICC and IID), the downmix signal 0 and the residual signal 22 are available as output of the encoding procedure.

Figure 3:
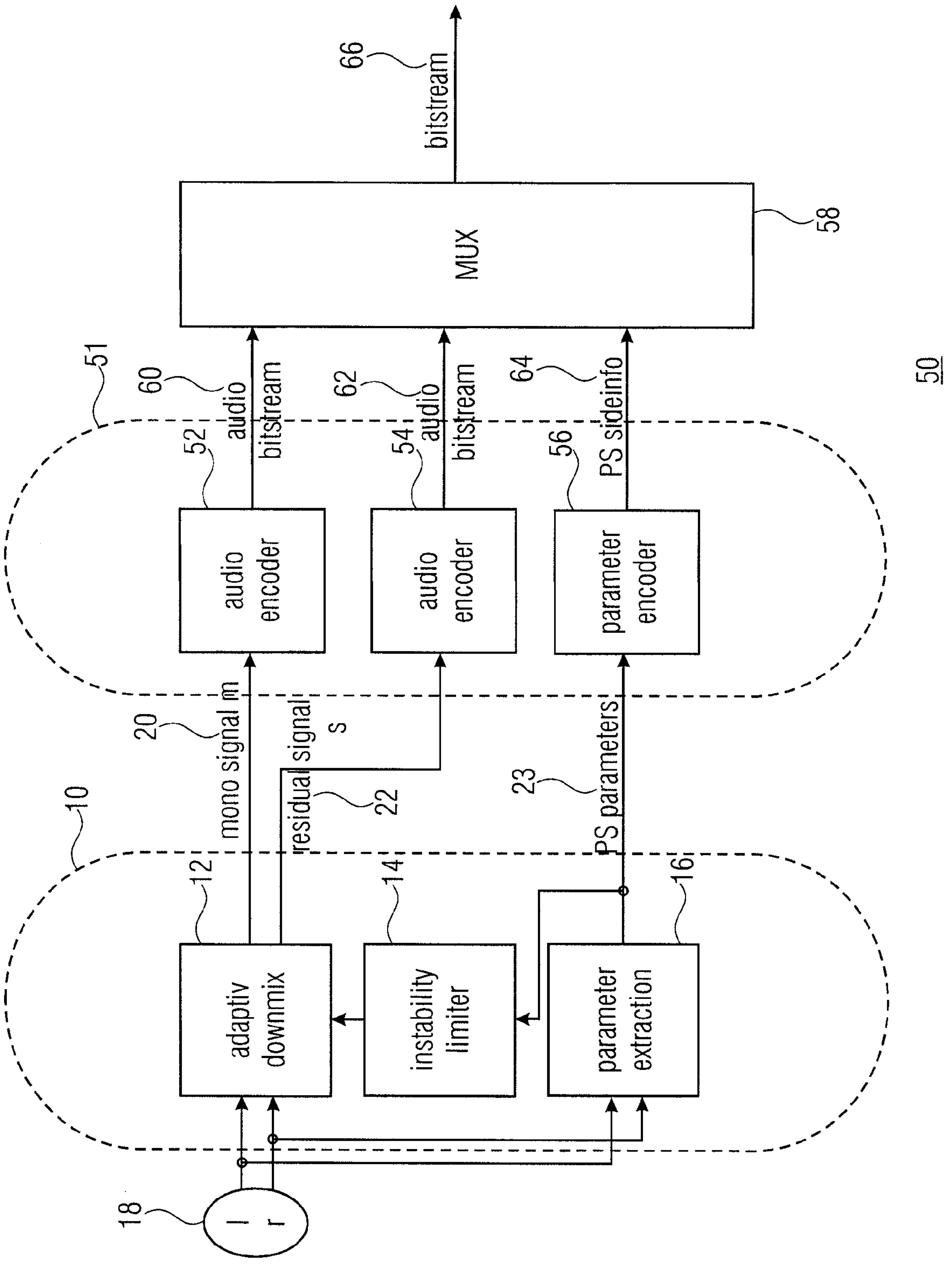
FIG. 3 shows another embodiment of an inventive encoder.

FIG. 3 shows another embodiment of an inventive audio encoding device 50 that comprises an audio encoder 10, a signal processing unit 51 having a first audio compressor 52, a second audio compressor 54, and a parameter compressor 56, and an output interface 58.

The components of the audio encoder 10 have already been discussed in the previous paragraphs. Therefore, only those parts of the audio encoding device 50 that are extending the audio encoder 10 will be discussed in the following paragraphs.

The general purpose of the signal processing unit 51 is to compress the downmix signal 20, the residual signal 22 and the parameters 23. Therefore, the downmix signal 20 is input into the first audio compressor 52, the residual signal 22 is input into the second audio compressor 54 and the spatial parameters 23 are input into the parameter compressor 56. The first audio compressor 52 derives a first audio bit stream 60, the second audio compressor 54 derives a second audio bit stream 62 and the parameter compressor 56 derives a parameter bit stream 64. The first and the second audio bit stream (60, 62) and the parameter bit stream 64 are then used as input of the output interface, that combines the three bit streams (60, 62, 64) to derive a combined bit stream 66, which is the output of the inventive encoding device 50.

The combination performed by the output interface 58 could for example be a simple multiplexing of the three incoming bit streams. Furthermore, any kind of combination that leads to a single output bit stream 66 is possible. Dealing with a single bit stream is much more convenient in handling, such as streaming via the internet or other data links.

In other words, FIG. 3 illustrates an encoder that takes a two-channel audio signal, comprising the channels l, r as input and generates a bitstream that permits decoding by a parametric stereo decoder. The adaptive downmix takes the two-channel signal l, r and generates a mono downmix m and a residual signal s. These signals can then be encoded by perceptual audio encoders to produce compact audio bit-streams. The parametric stereo (PS) parameter estimation takes the two-channel signal l, r as input and generates a set of PS parameters. The instability limiter modifies the PS parameters, which control the adaptive downmix. The encoding block produces the parametric stereo side information (PS sideinfo) from the unmodified output of the PS parameter estimation. The multiplexer combines all encoded data to form the combined bit-stream.

It is one of the major advantages of the inventive coding concept, that it is fully backwards compatible to prior art parametric stereo decoders. To illustrate this, FIG. 4 shows a prior art parametric stereo decoder.

The parametric stereo decoder 70 comprises an input interface 72, an audio decoder 74, a parameter decoder 76, and an up-mixer 78.

The input interface 72 receives a combined bit stream 80 as produced from by inventive audio encoder 50. The input interface 72 of the prior art parametric stereo decoder 70 does not recognize the residual signal 22 and therefore only extracts the downmix signal 60 (first audio bit stream 60 from FIG. 3) and the parameter bit stream 64 from the input bit stream 80. The audio decoder 74 is the complementary device to the first audio compressor 52 and the parameter decoder 76 is the complementary device to the parameter compressor 56. Therefore, the audio bit stream 60 is decoded into the downmix signal 20 and the parameter bit stream 64 is decoded to the spatial parameters 23. Since the spatial parameters 23 have been directly transferred and not been further processed by the inventive encoder 10 or 50, a prior art up-mixer 78 can reconstruct a left and a right channel, building an output signal 82 from the downmix signal 20 using the spatial parameters 23.

Figure 4:
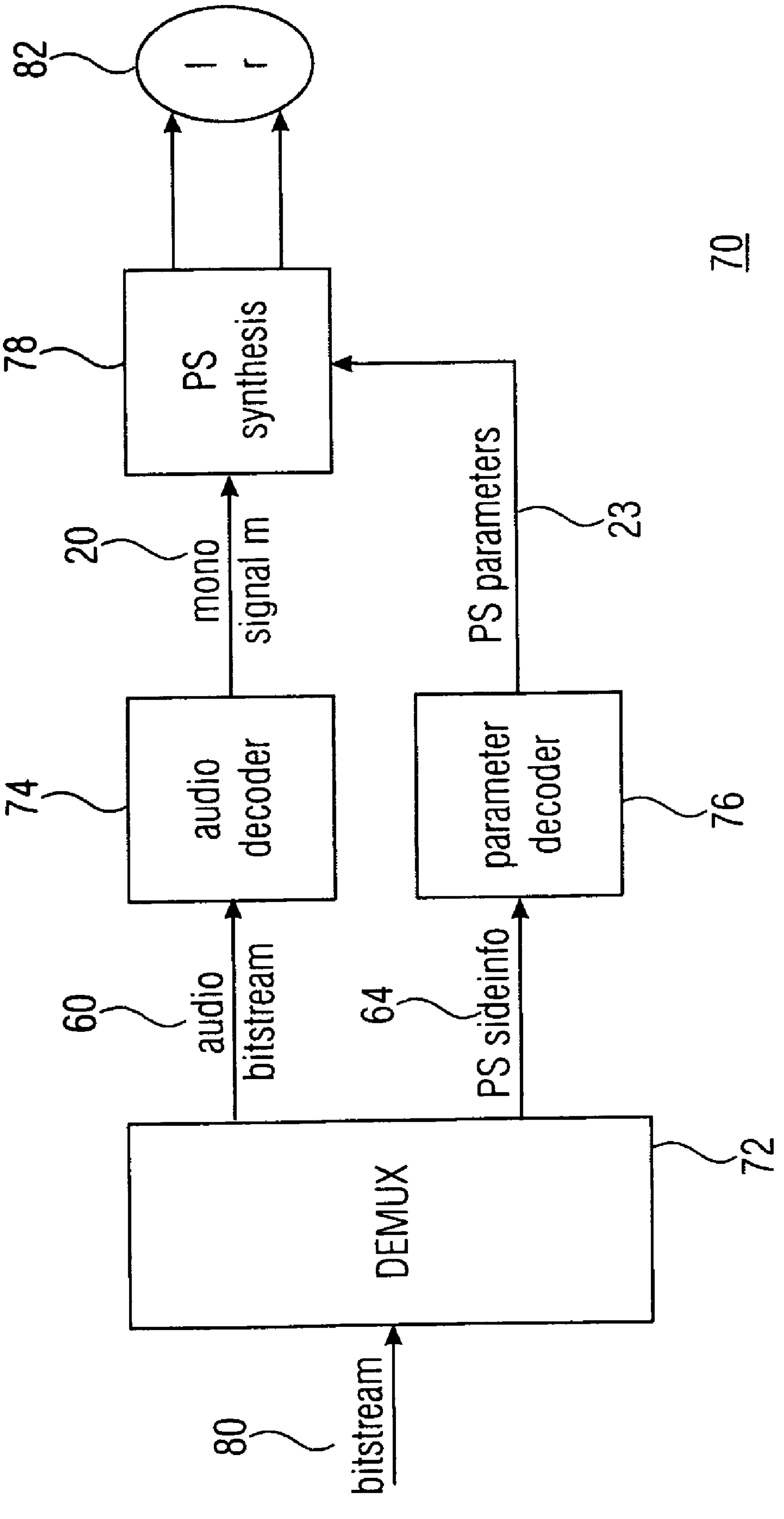
FIG. 4 shows the backwards compatibility of the inventive encoding scheme to prior art decoders.
Figure 5:
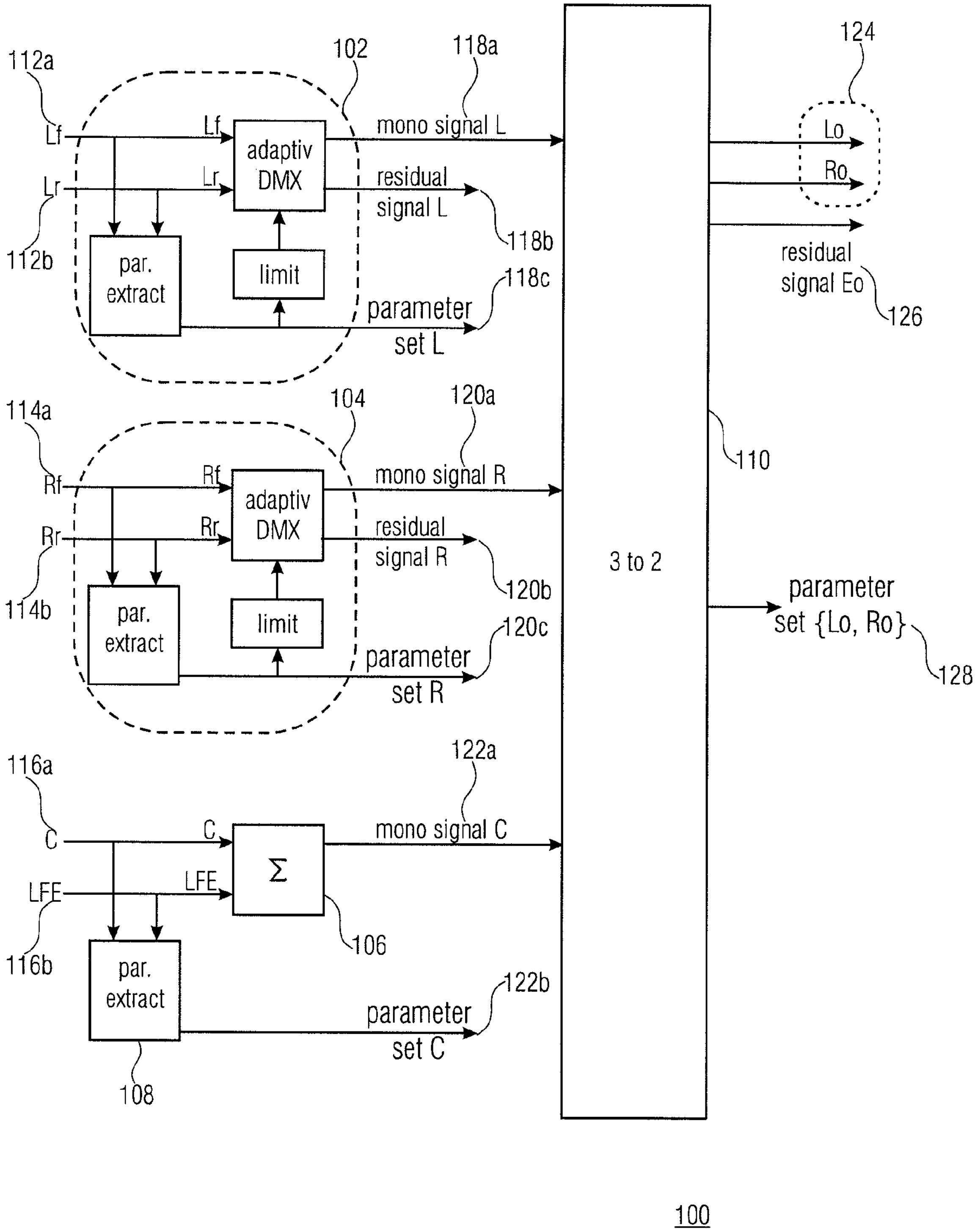
FIG. 5 shows an inventive multi-channel audio encoder.

In other words, FIG. 4 illustrates a parametric stereo decoder that takes a compatible bitstream as generated by an inventive encoding device 50 as input and generates the stereo audio signal comprising the channels l and r, without using or without having access to the part of the bitstream that describes the residual signal. First a demultiplexer takes the compatible bitstream as input and decomposes it into one audio bitstreams and the PS sideinfo. The perceptual audio decoder produces a mono signal m, and the PS sideinfo is decoded into PS parameters. The PS synthesis converts the mono signal into left and right signals l and r in accordance with the PS-parameters, in particular by adding a decorrelated signal in order to retain the channel correlation of the original stereo channels FIG. 5 shows an inventive multi-channel-audio encoder 100 that encodes a 6-channel audio signal into a stereo downmix and a number of parameter sets.

The multi-channel audio encoder 100 comprises a first adaptive encoder 102, a second adaptive encoder 104, estimation module 106, a parameter extractor 108, and a 3 to 2 down-mixer 110.

The first adaptive encoder 102 and the second adaptive encoder 104 are embodiments of an inventive encoder 10. The 6 channel input signal is having a left front channel 112*a*, a left rear channel 112*b*, a right front channel 114*a*, a right rear channel 114*b*, a center channel 116*a*, and a low frequency enhancement channel 116*b*. The left front channel 112*a* and the left rear channel 112*b* are input into the first adaptive encoder 102 that derives a first downmix signal 118*a*, the corresponding residual signal 118*b* and spatial parameters 118*c*. The right front channel 114*a* and the right rear channel 114*b* are input into the second adaptive encoder 104, that derives a second downmix signal 120*a*, the corresponding residual signal 120*b*, and the underlying spatial parameters 120*c*. The center channel 116*a* and the low frequency enhancement channel 116*b* are input into the summation module 106, that adds the signals to create a mono signal 122*a* and corresponding spatial parameters 122*b*.

The 3 to 2 down-mixer 110 receives the downmix signals 118*a*, 120*a*, and 122*a* to down-mix them into a stereo output signal 124 having a left and a right channel. The 3 to 2 down-mixer additionally derives a residual signal 126 from the input channels 118*a*, 120*a*, and 122*a*. Furthermore, the 3 to 2 down-mixer 110 derives a parameter set 128 from the parameter sets 118*b*, 120*b*, and 122*b*.

Summarizing shortly, FIG. 5 illustrates a part of a spatial audio encoder that takes as input a multi-channel audio signal in 5.1 format, comprising the channels Lf (left front), Lr (left surround), Rf (right front), Rr (right surround), C (centre) and LFE (low-frequency efficient), and that creates a stereo down-mix, comprising L0 and R0, and a number of parameter sets. Not shown in this figure are time to frequency transforms, coding of the down-mix signals and parameters, and multiplexing the coded information into a bit-stream which can be decoded by a corresponding spatial audio decoder. The adaptive down-mix takes as input the signals Lf and Lr and produces a mono signal L and a residual signal L. The parametric stereo (PS) parameter estimation takes the two-channel signal Lf and Lr as input and generates a set of PS parameters. The instability limiter modifies the PS parameters that control the adaptive down-mix. In a similar manner, the adaptive down-mix takes as input the signals Rf and Rr and produces a mono signal R and a residual signal R. The parametric stereo (PS) parameter estimation takes the two-channel signal Rf and Rr as input and generates a set of PS parameters. The instability limiter modifies the PS parameters that control the adaptive down-mix. The summation module adds the signals C and LFE to create a mono signal C. The parametric stereo (PS) parameter estimation takes the two-channel signal C and LFE as input and generates a set of IID parameters, a subset of PS parameters. The mono signals L, R and C are mixed to a stereo signal (Lo and Ro) and a residual signal Eo by the 3 to 2 module. The 3 to 2 module also outputs a parameter set {Lo, Ro}.

Figure 6:
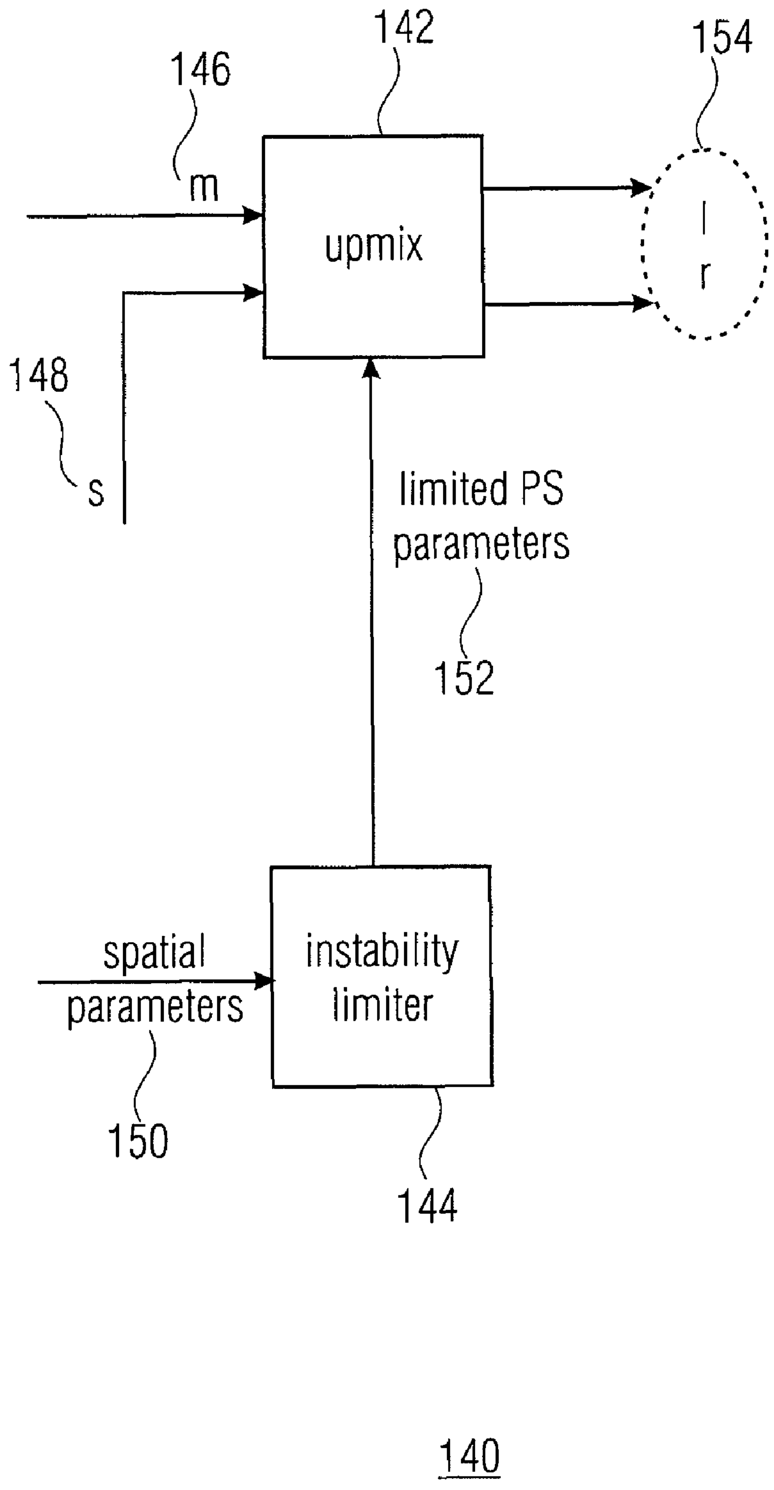
FIG. 6 shows a block diagram of an inventive audio decoder.

FIG. 6 describes an inventive audio decoder 140, comprising an up-mixer 142, and a limiter 144.

The inventive decoder 140 receives a downmix signal 146, a residual signal 148 and spatial parameters 150. The downmix signal 146 and the residual signal 148 are input into the up-mixer 142, whereas the spatial parameters 150 are input into the limiter 144. The limiter 144 limits the spatial parameters 150 to derive limited spatial parameters 152.

It is important to note, that the limiter is using the same limiting rule to derive the limited parameters as the corresponding encoder during the encoding process. The limited parameters are used to control the up-mixing process in the up-mixer 142 that derives a stereo signal 154 having a left and a right channel from the downmix signal 146 and the residual signal 148.

Figure 7:
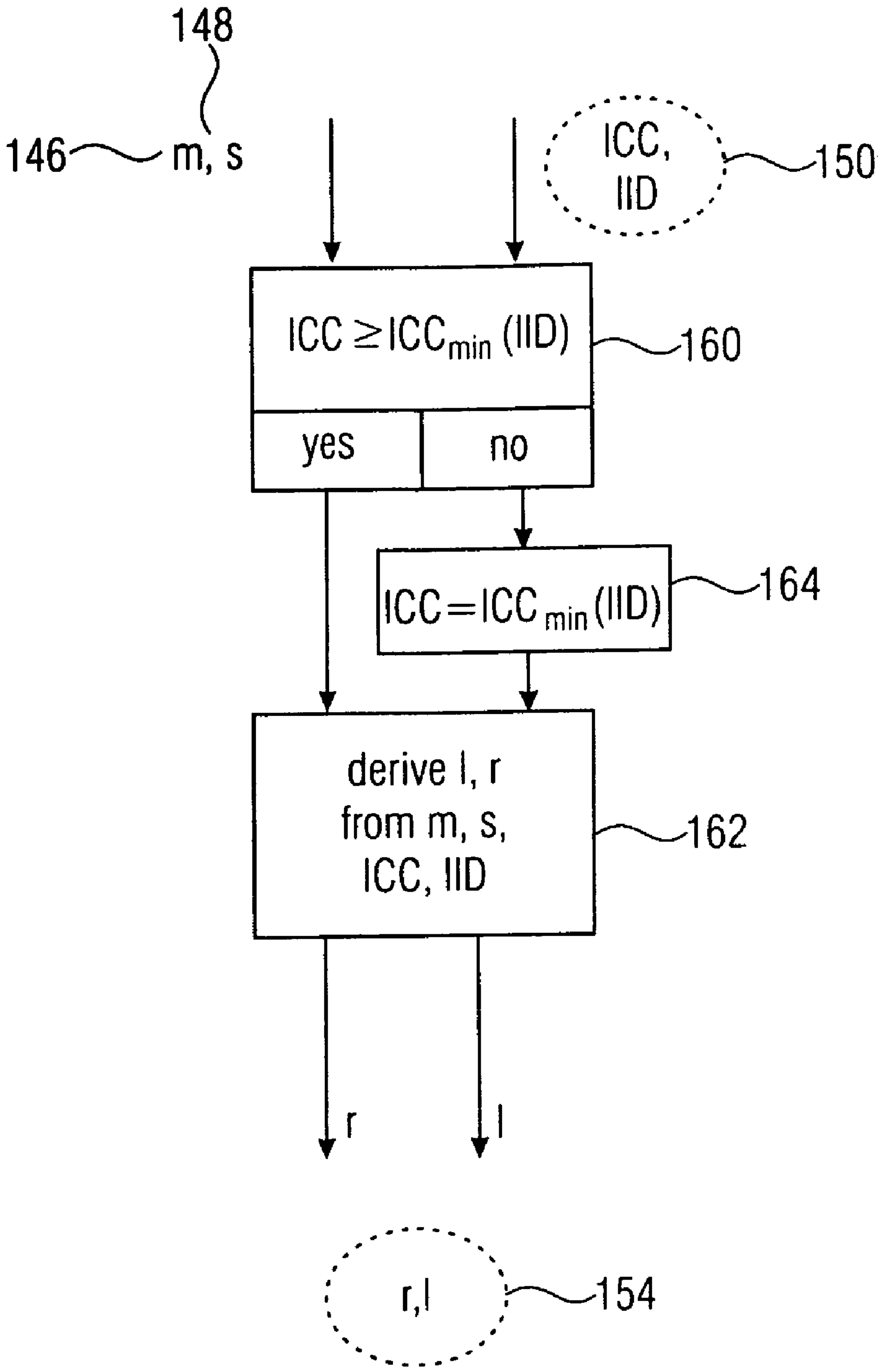
FIG. 7 shows a block diagram of the inventive decoding concept.

FIG. 7 shows a block diagram illustrating the principle of an inventive decoder. In a first limiting step 160 the received spatial parameters ICC and IID are limited. That is, it is checked whether the received ICC parameter exceeds a minimum ICC parameter $ICC_{min}$(IID). If this is the case, the spatial parameters 150 (ICC and IID), a received downmix signal 146, and a received residual signal 148 are transmitted to the up-mixing step 162. If the ICC parameter does not exceed the minimum ICC parameter $ICC_{min}$(IID), a limiting step 164 is additionally performed, where the value of the ICC parameter is exchanged by the value of the parameter $ICC_{min}$ (IID), having the effect, that the value of $ICC_{min}$(IID) is transmitted to the up-mixing step 162.

In the up-mixing step 162, a stereo signal 154 having a left and a right channel is derived from the downmix signal 146 and the residual signal 148, using the spatial parameters ICC and IID.

Figure 8:
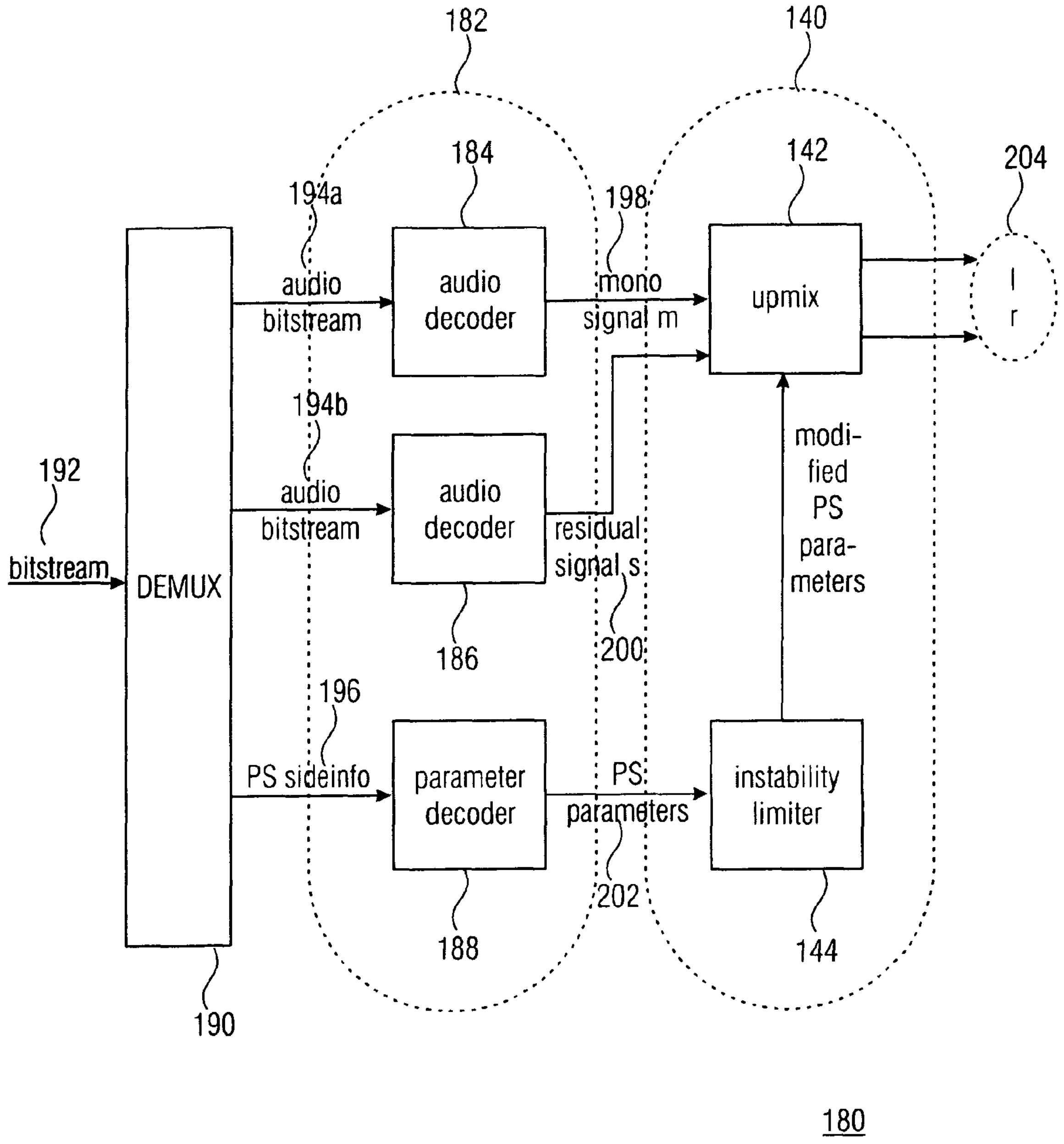
FIG. 8 shows a further embodiment of an inventive decoder.

FIG. 8 shows a further embodiment of an inventive decoding device 180 that comprises a decoder 140, a signal-processing unit 182 having a first audio decoder 184, a second audio decoder 186 and a parameter decoder 188. The decoding device 180 further comprises an input interface 190 for receiving a combined bit stream 192 that is generated by an inventive encoding device 50.

The combined bit stream 192 is decomposed by the input interface 190 to a first audio bit stream 194*a*, a second audio bit stream 194*b* and a parameter bit stream 196.

The first audio bit stream 194*a* is input into the first audio decoder 185, the second audio bit stream 194*b* is input into the second audio decoder 186, and the parameter bit stream 196 is input into the parameter decoder 188. The decompressed downmix signal 198 (m) and the residual signal 200 (s) are input into the up-mixer 142 of the decoder 140. Spatial parameters 202 derived by the parameter decoder 188 are input into the limiter 144 of the audio decoder 140. The limiting of the spatial parameters and the up-mixing have already been described within the description of the audio decoder 140. A detailed description can be obtained from the corresponding paragraphs of the description of FIG. 6.

The inventive decoding device 180 finally outputs a stereo signal 204, having a left and a right channel.

In other words, FIG. 8 illustrates a parametric stereo decoder that takes a compatible bitstream as input and generates the stereo audio signal comprising the channels l and r. First a demultiplexer takes the compatible bit stream as input and decomposes it into two audio bit streams and the PS side info. Perceptual audio decoders produce a mono signal m and a residual signal s respectively, and the PS side info is decoded into PS parameters by the parameter decoder. The instability limiter modifies the PS parameters. The up-mixer converts the mono and residual signals into left and right signals l and r by means of a rotation matrix defined from the PS parameters modified by the instability limiter.

Figure 9:
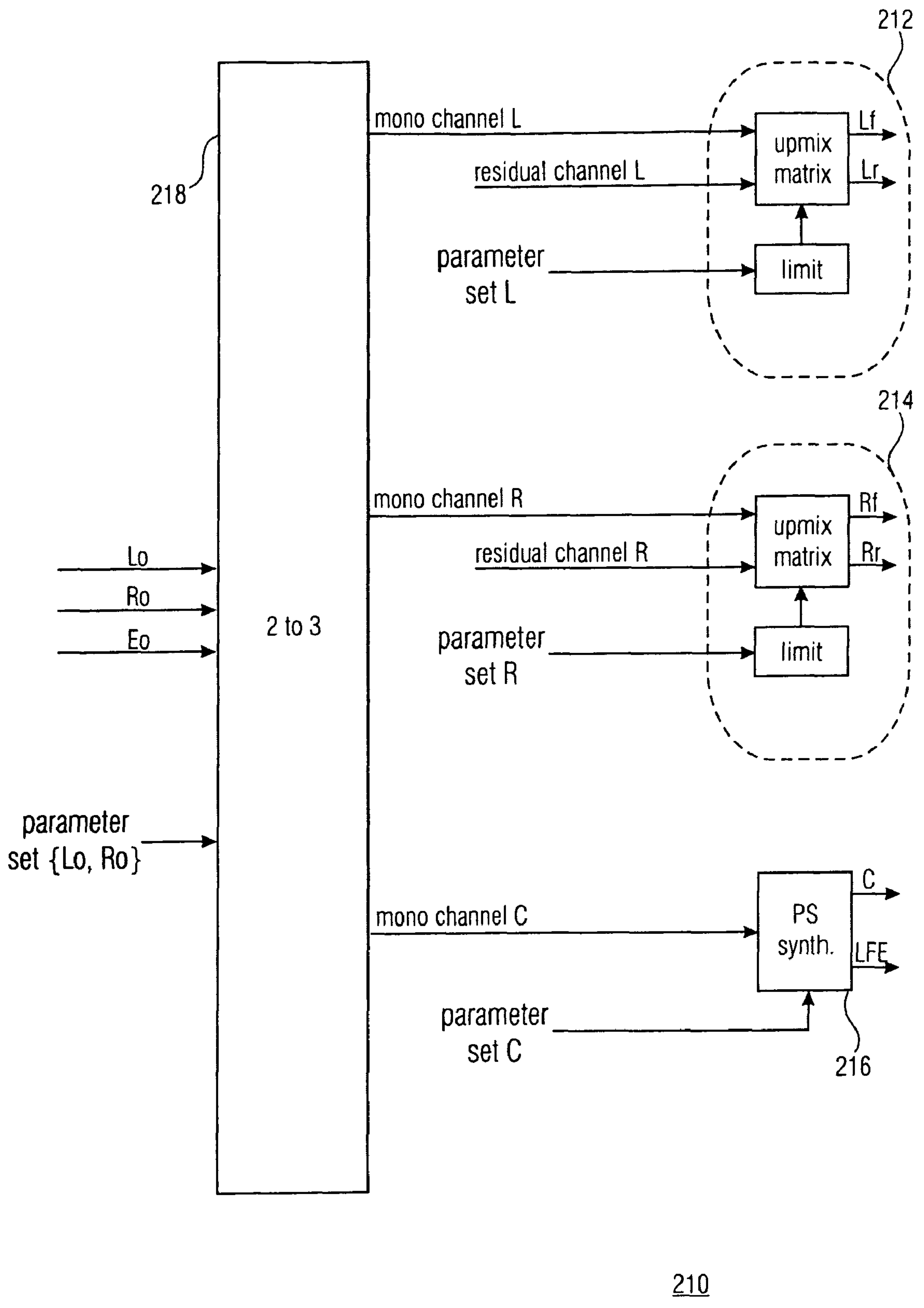
FIG. 9 shows an embodiment of an inventive multi-channel audio decoder.

FIG. 9 shows an inventive multi-channel audio decoder 210 comprising a first two-channel decoder 212, a second two-channel decoder 214, a synthesis module 216, and a 2 to 3 module 218.

FIG. 9 illustrates part of a spatial audio decoder that takes as input a stereo audio signal (comprising the Lo and Ro), a residual signal Eo and a parameter set {Lo, Ro}. The 2 to 3 module 218 produces three audio channels L, R, and C from the above-mentioned input. The mono channel L and the residual channel L are converted by a first two-channel decoder 212 into the Lf and Lr output signals. The instability limiter modifies the PS parameter set L. Similarly, the mono channel R and the residual channel R are converted by a second two-channel decoder 214 into the Rf and Rr output signals. The instability limiter is the same as used during the generation of the mono channel R and modifies the PS parameter set R. The PS synthesis module 216 takes the mono channel C and parameter set C and generates the C and LFE output channels.

Figure 10:
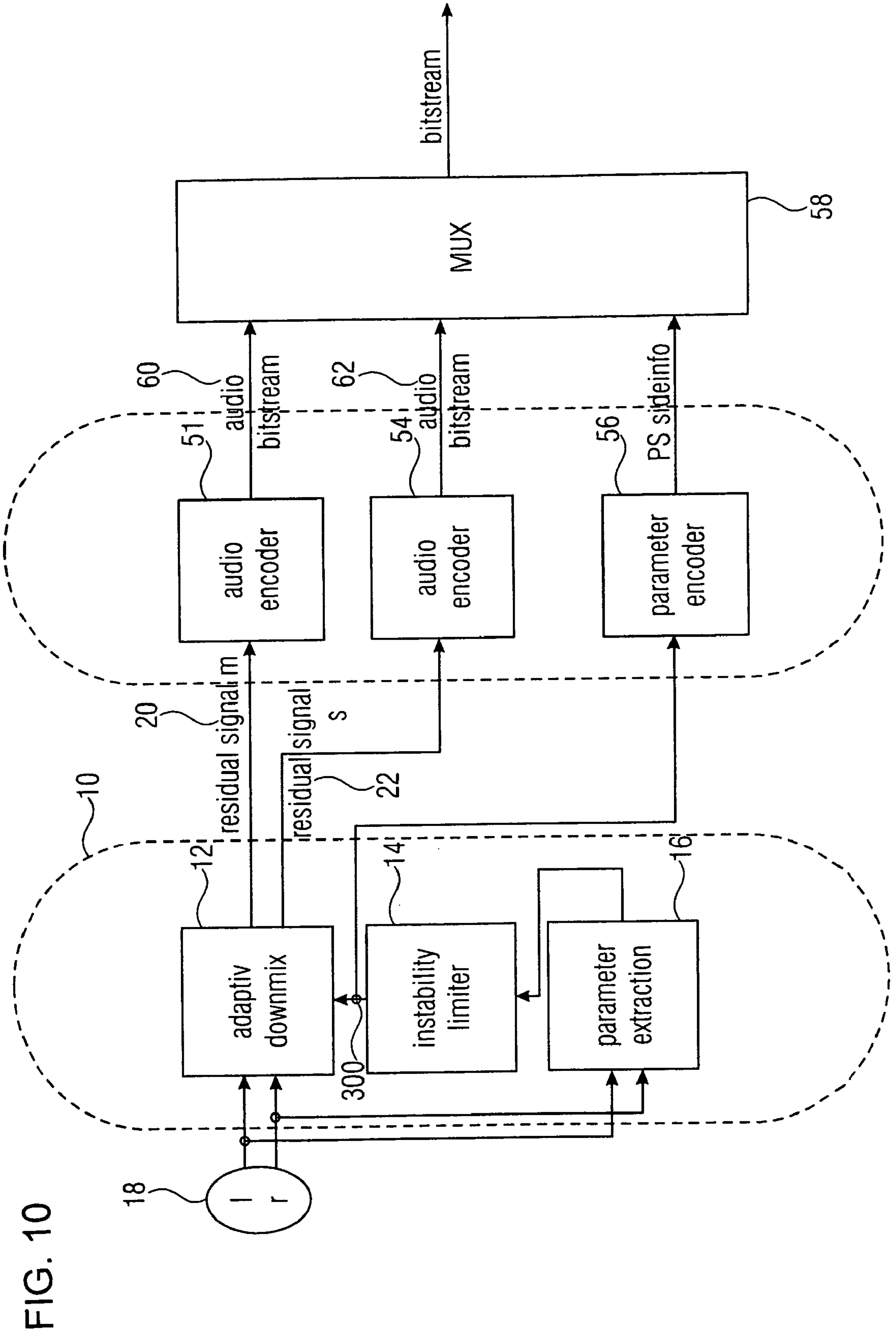
FIG. 10 shows an alternative embodiment of an inventive audio encoder.
Figure 11:
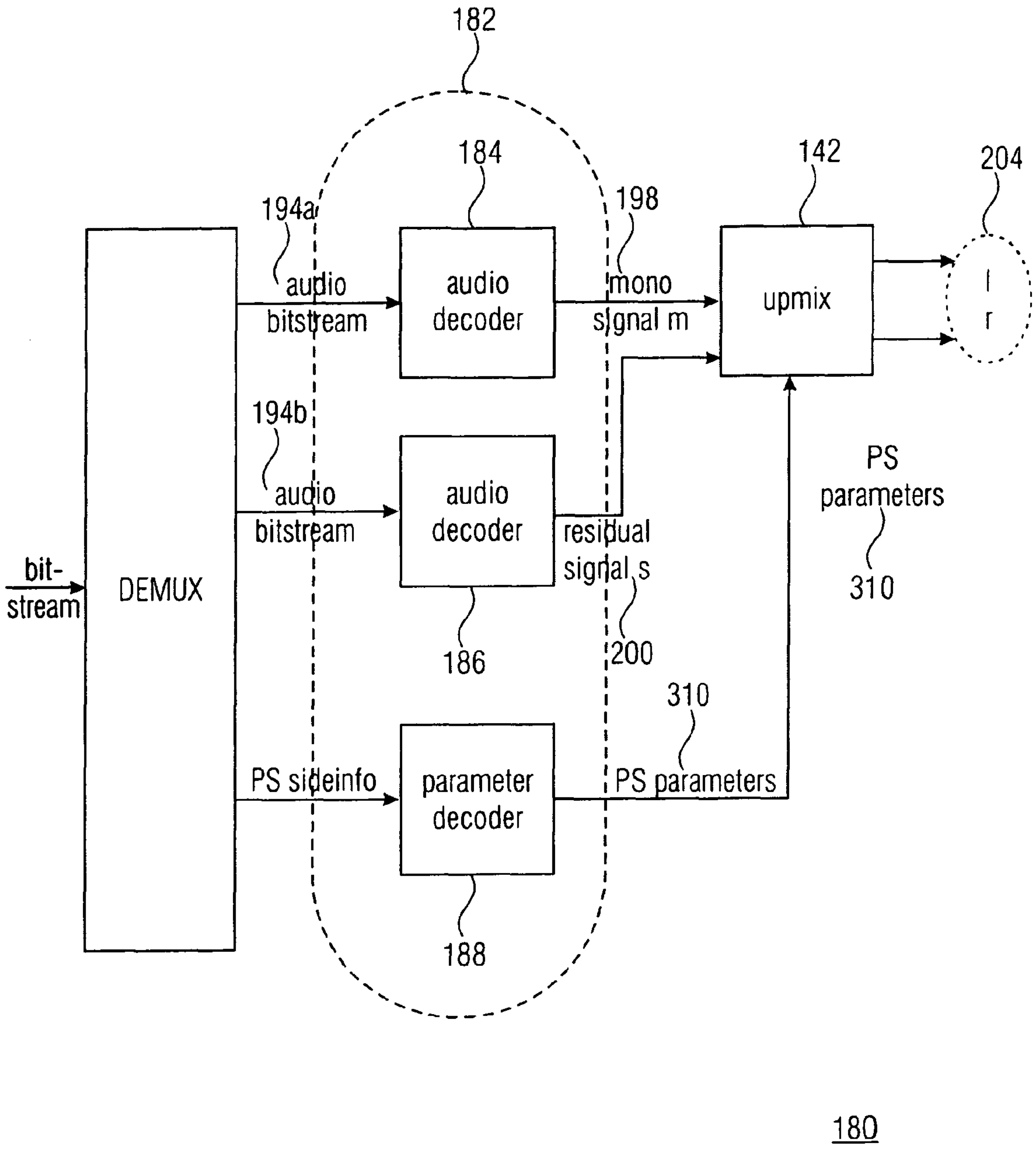
FIG. 11 shows an alternative embodiment of an inventive audio decoder.

FIGS. 10 and 11 show an alternative solution for an encoder and a decoder avoiding the instability problem. The alternative is based on using the limited spatial parameters as the parameters to be encoded and transmitted. This can be seen in the inventive encoder in FIG. 10 that is based on the inventive encoding device of FIG. 3.

FIG. 10 shows a modification of an inventive encoder already shown in FIG. 3, with the difference, that the parameters fed into the parameter encoder 56 are taken at a point 300, i.e. after the limiting process. That is, the limited parameters are encoded and transmitted instead of the original parameters.

On the decoder side shown in FIG. 11, the modification that the limiter can be omitted compared to the decoding device 180. Therefore, the decoded spatial parameter 310 is input directly into the up-mixer 142 to derive the stereo signal 204.

The disadvantages of this solution compared to the placement of instability limiters as taught before and shown in the previous figures are twofold. First, the quantization of the limited parameters would move the rotators further away from the optimality then necessary. The size of the residual therefore would be larger in general, leading to a loss in encoding gain for the residual coding method. Second, backwards compatibility to parametric-stereo decoding would be lost. In critical cases, when the channel correlation of the original channel is negative, the decoder would not be able to reproduce this correlation without access to the residual signal.

Figure 12:
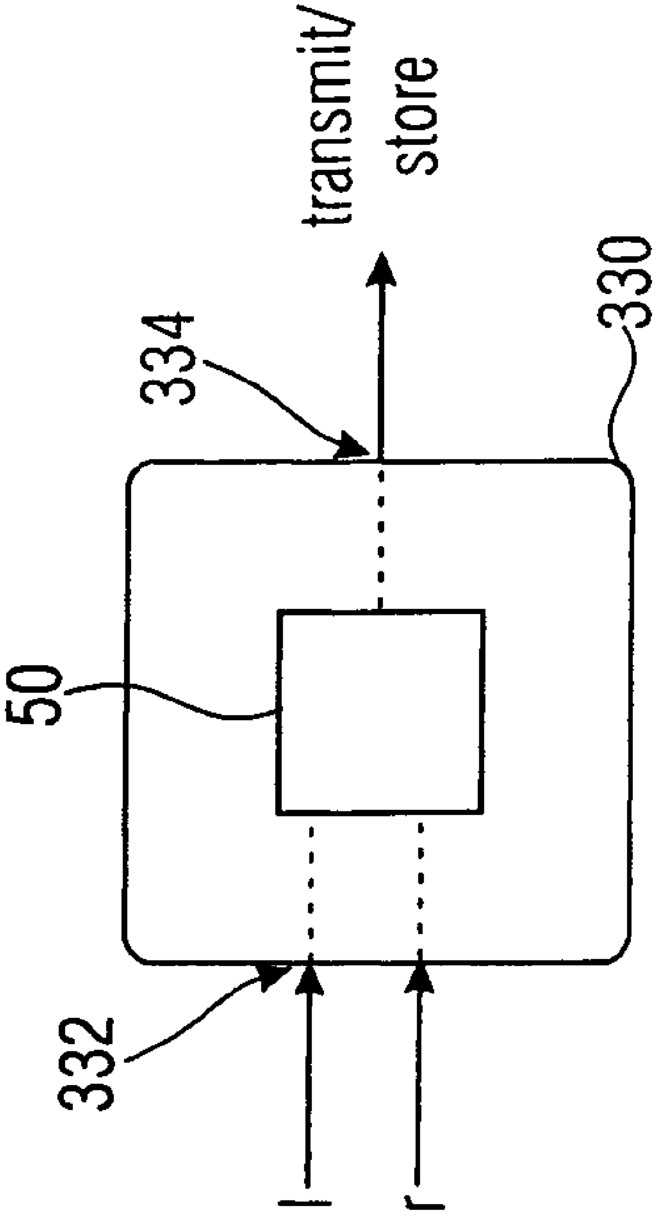
FIG. 12 shows an inventive transmitter/audio-recorder.

FIG. 12 is showing an inventive audio transmitter or recorder 330 that is having an audio encoder 50, an input interface 332 and an output interface 334.

An audio signal can be supplied at the input interface 332 of the transmitter/recorder 330. The audio signal is encoded by an inventive encoder 50 within the transmitter/recorder and the encoded representation is output at the output interface 334 of the transmitter/recorder 330. The encoded representation may then be transmitted or stored on a storage medium.

Figure 13:
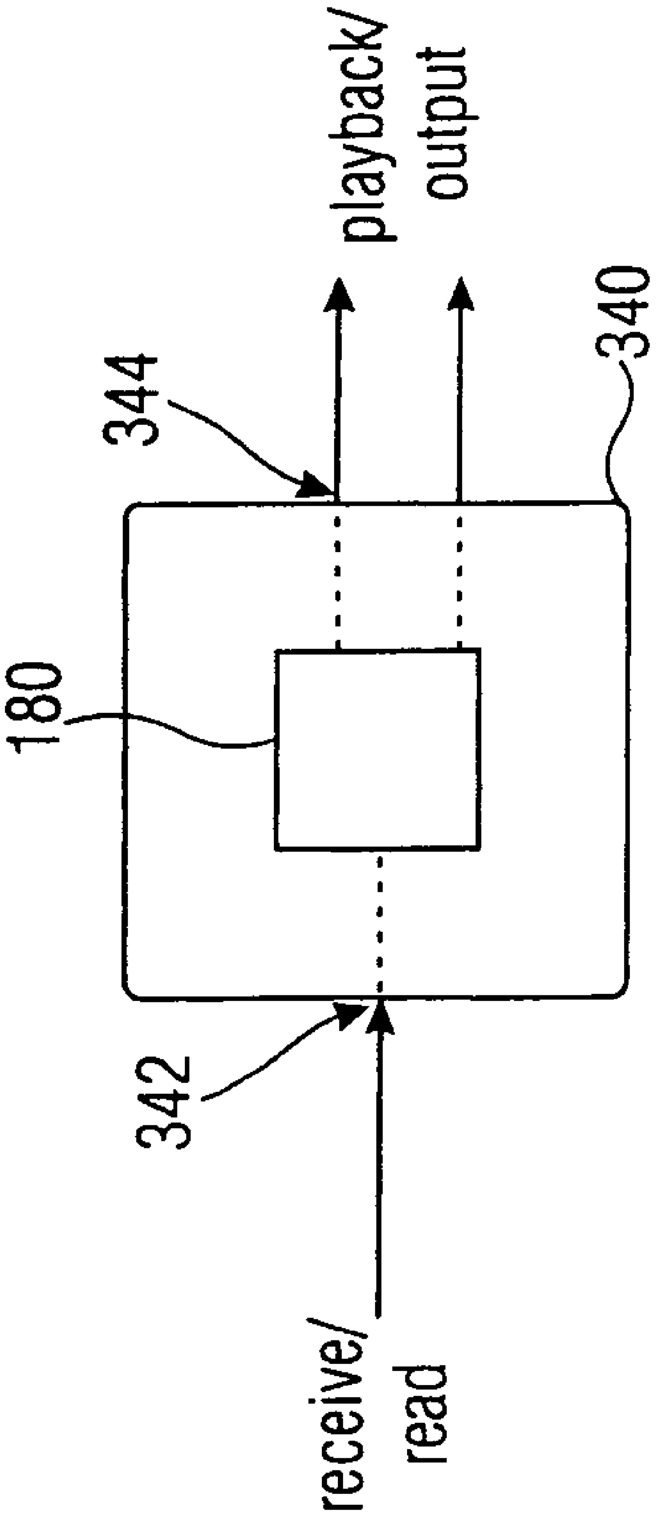
FIG. 13 shows an inventive receiver/audio-player.

FIG. 13 shows an inventive receiver or audio player 340, having an inventive audio decoder 180, a bit stream input 342, and an audio output 344.

A bit stream can be input at the input 342 of the inventive receiver/audio player 340. The bit stream then is decoded by the decoder 180 and the decoded signal is output or played at the output 344 of the inventive receiver/audio player 340.

Figure 14:
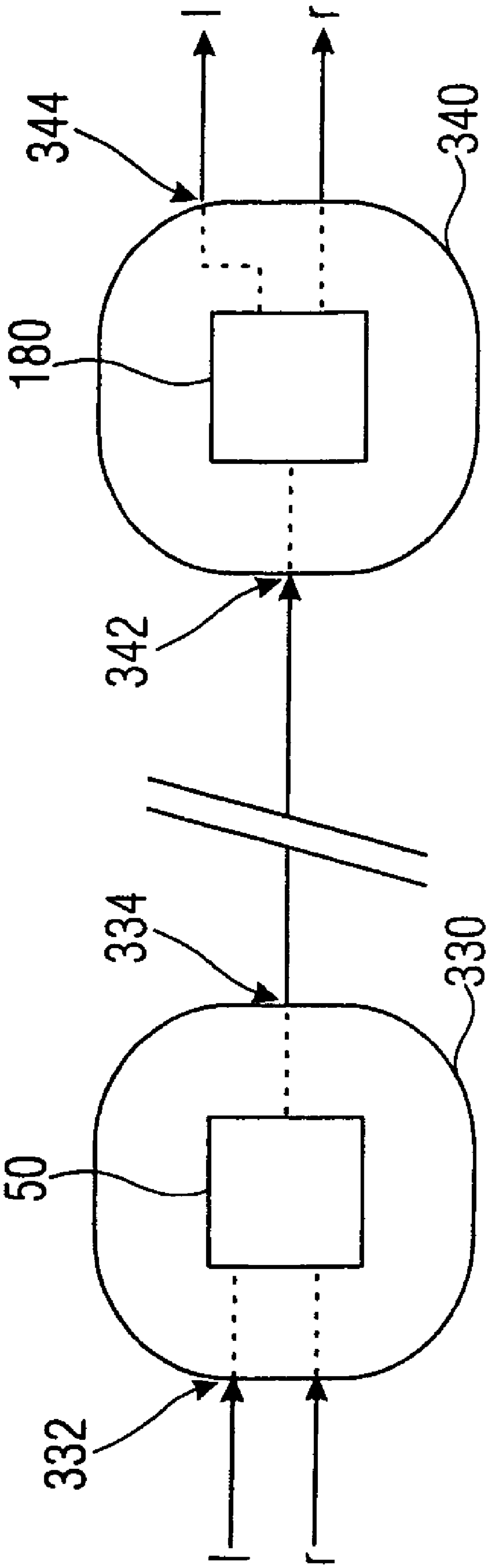
FIG. 14 shows an inventive transmission system.

FIG. 14 shows a transmission system comprising an inventive transmitter 330, and an inventive receiver 340.

The audio signal input at the input interface 332 of the transmitter 330 is encoded and transferred from the output 334 of the transmitter 330 to the input 342 of the receiver 340. The receiver decodes the audio signal and plays back or outputs the audio signal on its output 344.

The above-mentioned and described embodiments of the present invention are merely illustrative for the principles of the present invention for the improvement of adaptive residual coding. It is understood that modifications and variations of the arrangements and details described herein will be operand to others skilled in the art. It is the intent, therefore, to be limited only by the scope of the impending patent claims and not by the specific details presented by way of description and explanation of the embodiments herein.

Although the embodiments of the present invention described in the figures above are described using mainly a nomenclature used for stereo signals, it is apparent that the present invention is not limited to stereo signals but could be applied to any other kind of combination of two audio signals, as for example done within the multi-channel audio encoders and decoders shown in FIG. 5 and FIG. 9.

Using an inventive transmission system having a transmitter and a receiver, the transmission between the transmitter and the receiver can be achieved by various means. This can be for example life streaming over the Internet or other network media, storing a file on a computer readable media and transferring the media, directly connecting the transmitter and the receiver by cable or wireless such as wireless LAN or Bluetooth and any other imaginable data connection.

Although it has been described in detail, that the ICC parameter only is to be changed to assure a non-diverging up- and downmix matrix, it is also possible to limit both the IID and IIC parameters such that no divergence will occur. More generally, applying the inventive concept can also mean deriving other spatial parameters and applying a limiting rule to these parameters, assuring for a non-diverging down- and up-mix.

The output and input interfaces in the inventive encoders and decoders are not limited to simple multiplexers or demultiplexers only. In a more sophisticated variation, the output interface may combine the bit streams not by just multiplexing them but by any other means, possibly even by trying some further entropy coding to reduce the size of the bit stream.

Depending on certain implementation requirements of the inventive methods, the inventive methods can be implemented in hardware or in software. The implementation can be performed using a digital storage medium, in particular a disk, DVD or a CD having electronically readable control signals stored thereon, which cooperate with a programmable computer system such that the inventive methods are performed. Generally, the present invention is, therefore, a computer program product with a program code stored on a machine-readable carrier, the program code being operative for performing the inventive methods when the computer program product runs on a computer. In other words, the inventive methods are, therefore, a computer program having a program code for performing at least one of the inventive methods when the computer program runs on a computer.

While the foregoing has been particularly shown and described with reference to particular embodiments thereof, it will be understood by those skilled in the art that various other changes in the form and details may be made without departing from the spirit and scope thereof. It is to be understood that various changes may be made in adapting to different embodiments without departing from the broader concepts disclosed herein and comprehended by the claims that follow.

We claim:

1. Audio encoder for encoding an audio signal having at least two channels, comprising:

a parameter extractor for deriving a coherence parameter (ICC) describing a coherence between a first channel and a second channel of the at least two channels and a level parameter (IID) describing a level differenced between the first channel and the second channel as spatial parameters;

a hardware limiter for limiting the coherence parameter to derive a limited coherence parameter, wherein a limit of the coherence parameter depends on the level parameter and on a scaling factor; and a hardware down-mixer for deriving a downmix signal and a residual signal from the audio signal using a down-mixing rule depending on the limited coherence parameter.

2. Audio encoder in accordance with claim 1, in which the parameter extractor is operative to derive multiple spatial parameters for a given time portion of the audio signal, wherein each spatial parameter describes the interrelation of the at least two channels for a predefined frequency interval.

3. Audio encoder in accordance with claim 1, in which the limiter is operative to limit the spatial parameter such that a gain factor describing a ratio of intensities between the downmix signal and the at least two channels does not exceed a predefined limit.

4. Audio encoder in accordance with claim 1, in which a limiting rule of the limiter is such that a lower limit for the coherence parameter (ICC) depends on the level parameter (IID) and on the scaling factor which depends on a predefined gain factor $g_0$, wherein the coherence parameter (ICC) can be described by the following expression:

$$ICC \geq \frac{1}{2} \cdot \left(\frac{1}{g_0^2} - 1\right) \cdot \left(IID + \frac{1}{IID}\right).$$

5. Audio encoder in accordance with claim 4, in which the predefined gain factor $g_0$ is chosen from the interval [1, 2].

6. Audio encoder in accordance with claim 1, in which the down-mixer is operative to use a down-mixing rule such that the downmix signal and the residual signal are derived by forming a linear combination of the channels from the at least two channels, wherein the coefficients of the linear combination are depending on the limited coherence parameter.

7. Audio encoder in accordance with claim 1, in which the down-mixing rule is such that the deriving of the downmix signal m and the residual signal s can be described by the following equations, depending on the ICC and IID parameters:

$$m = \sqrt{\frac{IID^2 + 1}{IID^2 + 1 + 2 \cdot IID \cdot ICC}} \cdot (l + r)$$

$$s = \frac{1}{2} \cdot (l - r) - \frac{1}{2} \cdot \frac{IID^2}{IID^2 + 1 + 2 \cdot IID \cdot ICC} \cdot (l + r).$$

Wherein l and r are representations of the first and second channels.

8. Audio encoder in accordance with claim 1, further comprising a signal processing unit for processing or transmitting the downmix signal, the residual signal, and the spatial parameters to derive a processed downmix signal, a processed residual signal, and processed spatial parameters.

9. Audio encoder in accordance with claim 8, in which the signal processing unit is operative to derive the processed downmix signal, the processed residual signal, and the processed spatial parameters such that the deriving includes a compression of the downmix signal, the residual signal, and the spatial parameters.

10. Audio encoder in accordance with claim 8, further comprising an output interface for providing the information of the processed downmix signal, the processed residual signal, and the processed spatial parameters.

11. Audio encoder in accordance with claim 10, in which the output interface is operative to combine the processed downmix signal, the processed residual signal, and the processed spatial parameters to derive an output bit stream having the information of the processed downmix signal, the processed residual signal and the processed spatial parameters.

12. Audio encoder in accordance with claim 11, in which the output interface is operative to multiplex the processed downmix signal, the processed residual signal, and the processed spatial parameters to derive the output bit stream.

13. Audio encoder in accordance with claim 1, in which multiple pairs of channels are encoded, wherein for each pair of channels a spatial parameter, a downmix signal and a residual signal is derived.

14. Audio encoder in accordance with claim 13, wherein the multiple pairs of channels comprise a left front, a left rear, a right front, a right rear, a low frequency enhancement and a center channel.

15. Audio decoder for decoding an encoded audio signal representing an original audio signal having at least two channels, the encoded audio signal having a downmix signal, a residual signal as well as a coherence parameter (ICC) describing a coherence between a first and a second channel of the at least two channels and a level parameter (IID) describing a level difference between the first and the second channel as spatial parameters, comprising:

a hardware limiter for limiting the coherence parameter to derive a limited coherence parameter wherein the limit of the coherence parameter depends on the level parameter and on a scaling factor; and a hardware up-mixer for deriving a reconstruction of the original audio signal from the downmix signal and the residual signal using an up-mixing rule depending on the limited coherence parameter.

16. Audio decoder in accordance with claim 15, in which the limiter is operative to limit multiple coherence parameters for a given time portion of the encoded audio signal corresponding to a time frame of the original audio signal, wherein each coherence parameter describes the interrelation between the at least two channels for a predefined frequency interval within the time frame.

17. Audio decoder in accordance with claim 15, in which the limiter is operative to limit the coherence parameter such that a ratio of intensities between the downmix signal and the at least two channels of the original audio signal does not exceed a predefined limit.

18. Audio decoder in accordance with claim 17, in which a limiting rule of the limiter is such that a lower limit for the coherence parameter ICC depends on the level parameter (IID) and the scaling factor which depends on a predefined gain factor $g_0$, wherein the lower limit for the coherence parameter ICC can be described by the following expression:

$$ICC \geq \frac{1}{2} \cdot \left(\frac{1}{g_0^2} - 1\right) \cdot \left(IID + \frac{1}{IID}\right).$$

19. Audio decoder in accordance with claim 18, in which the predefined gain factor $g_0$ is chosen from the interval [1, 2].

20. Audio decoder in accordance with claim 15, in which the up-mixer is operative to use an up-mixing rule such that a first reconstructed channel and a second reconstructed channel of the at least two channels are derived by forming a linear combination of the downmix signal and the residual signal, wherein the coefficients of the linear combination are depending on the limited coherence parameter.

21. Audio decoder in accordance with claim 20, in which the up-mixing rule is such that the deriving of the first reconstructed channel l and the second reconstructed channel r from the down-mixing signal m and the residual signal s can be described by the following equations $$l = c_L \cdot \cos(\alpha + \beta) \cdot m + s$$

$$r = c_R \cdot \cos(-\alpha + \beta) \cdot m - s,$$

wherein $$\alpha = \frac{1}{2} \cdot \cos^{-1}(ICC); \beta = \tan^{-1}\left(\frac{c_R - c_L}{c_R + c_L} \cdot \tan(\alpha)\right)$$

$$c_L = \frac{IID}{\sqrt{1 + IID^2}}; c_R = \frac{1}{\sqrt{1 + IID^2}}.$$

22. Audio decoder in accordance with claim 15, further comprising a signal processing unit for transmitting or processing a processed residual signal, a processed downmix signal, and processed spatial parameters to derive the residual signal, the downmix signal, and the spatial parameters.

23. Audio decoder in accordance with claim 22, in which the signal processing unit is operative to derive the residual signal, the downmix signal, and the spatial parameter such that the deriving of the residual signal, the downmix signal and the spatial parameters includes decompression of the processed residual signal, the processed downmix signal, and the processed spatial parameters.

24. Audio decoder in accordance with claim 22, further comprising an input interface for providing the processed residual signal, the processed downmix signal and the processed spatial parameters.

25. Audio decoder in accordance with claim 24, in which the input interface is operative to decompose a single input bit stream to derive the processed residual signal, the processed downmix signal and the processed spatial parameters.

26. Audio decoder in accordance with claim 25, in which the input interface is operative to decompose the single input bit stream such that the deriving of the processed residual signal, the processed downmix signal and the processed parameters includes a de-multiplexing of the input bit stream.

27. Method for encoding an audio signal having at least two channels, the method comprising:

deriving a coherence parameter (ICC) describing a coherence between a first channel and a second channel of the at least two channels and a level parameter (IID) describing a level difference between the first channel and the second channel as spatial parameters;

limiting the coherence parameter to derive a limited coherence parameter, wherein a limit of the coherence parameter depends on the level parameter and on a scaling factor spatial parameter using a limiting rule to derive a limited spatial parameter, wherein the limiting rule depends on an interrelation between the at least two channels; and deriving a downmix signal and a residual signal from the audio signal using a down-mixing rule depending on the limited coherence parameter.

28. Method for decoding an encoded audio signal representing an original audio signal having at least two channels, the encoded audio signal having a downmix signal, a residual signal as well as a coherence parameter (ICC) describing a coherence between a first and a second channel of the at least two channels and a level parameter (IID) describing a level difference between the first and the second channel as spatial parameters, the method comprising:

limiting the coherence parameter to derive a limited coherence parameter, wherein a limit of the coherence parameter depends on the level parameter and on a scaling factor; and deriving a reconstruction of the original audio signal from the downmix signal and the residual signal using an up-mixing rule depending on the limited coherence parameter.

29. Transmitter or audio recorder having an audio encoder for encoding an audio signal having at least two channels, comprising:

a parameter extractor for deriving a coherence parameter describing a coherence between a first and a second channel of the at least two channels and a level parameter describing a level difference between the first and the second channel as spatial parameters;

a hardware limiter for limiting the coherence parameter to derive a limited coherence parameter, wherein the limit of the coherence parameter depends on the level parameter and on a scaling factor; and a hardware down-mixer for deriving a downmix signal and a residual signal from the audio signal using a down-mixing rule depending on the limited coherence parameter.

30. Receiver or audio player, having an audio decoder for decoding an encoded audio signal representing an original audio signal having at least two channels, the encoded audio signal having a downmix signal, a residual signal as well as a coherence parameter describing a coherence between a first and a second channel of the at least two channels and a level parameter describing a level difference between the first and the second channel as spatial parameters comprising: and a spatial parameter describing an interrelation between the at least two channels, comprising:

a hardware limited for limiting the coherence parameter to derive a limited coherence parameter, wherein the limit of the coherence parameter depends on the level parameter and on a scaling factor; and a hardware up-mixer for deriving a reconstruction of the original audio signal from the downmix signal and the residual signal using an up-mixing rule depending on the limited coherence parameter.

31. Method of transmitting or audio recording the method having a method of generating an encoded signal, the method comprising a method for encoding an audio signal having at least two channels, the method comprising:

deriving coherence parameter (ICC) describing a coherence between a first and a second channel of the at least two channels and a level parameter (IID) describing a level difference between the first and the second channel as spatial parameters;

limiting the coherence parameter to derive a limited coherence parameter, wherein the limit of the coherence parameter depends on the level parameter and on a scaling factor; and deriving a downmix signal and a residual signal from the audio signal using a down-mixing rule depending on the limited coherence parameter.

32. Method of receiving or audio playing, the method having a method for decoding an encoded audio signal representing an original audio signal having at least two channels, the encoded audio signal having a downmix signal, a residual signal as well as a coherence parameter (ICC) describing a coherence between a first and a second channel of the at least two channels and a level parameter (IID) describing a level difference between the first and the second channel as spatial parameters, the method comprising:

limiting the coherence parameter to derive a limited coherence parameter, wherein the limit of the coherence parameter depends on the level parameter and on a scaling factor; and deriving a reconstruction of the original audio signal from the downmix signal and the residual signal using an up-mixing rule depending on the limited coherence parameter.

33. Transmission system having a transmitter and a receiver, the transmitter having an audio encoder for encoding an audio signal having at least two channels, comprising:

a parameter extractor for deriving a coherence parameter (ICC) describing a coherence between a first and a second channel of the at least two channels and a level parameter (IID) describing a level difference between the first and the second channel as spatial parameters;

a hardware limiter for limiting the coherence parameter to derive a limited coherence parameter, wherein the limit of the coherence parameter depends on the level parameter and on a scaling factor; and a hardware down-mixer for deriving a downmix signal and a residual signal from the audio signal using a downmixing rule depending on the limited coherence parameter;

the receiver having an audio decoder for decoding an encoded audio signal representing an original audio signal having at least two channels, the encoded audio signal having a downmix signal, a residual signal as well as a coherence parameter (ICC) describing a coherence between a first and a second channel of the at least two channels and a level parameter (IID) describing a level difference between the first and the second channel as spatial parameters comprising:

a hardware limiter for limiting the coherence parameter to derive a limited coherence parameter, wherein the limit of the coherence parameter depends on the level parameter and on a scaling factor; and an hardware up-mixer for deriving a reconstruction of the original audio signal from the downmix signal and the residual signal using an up-mixing rule depending on the limited coherence parameter.

34. Method of transmitting and receiving, the method including a transmitting method having a method of generating an encoded signal of an audio signal having at least two channels, comprising:

deriving a coherence parameter (ICC) describing a coherence between a first and a second channel of the at least two channels and a level parameter (IID) describing a level difference between the first and the second channel as spatial parameters;

limiting the coherence parameter to derive a limited coherence parameter, wherein the limit of the coherence parameter depends on the level parameter and on a scaling factor; and deriving a downmix signal and a residual signal from the audio signal using a down-mixing rule depending on the limited coherence parameter; and the method of receiving comprising a method for decoding an encoded audio signal representing an original audio signal having at least two channels, the encoded audio signal having a downmix signal, a residual signal as well as a coherence parameter (ICC) describing a coherence between a first and a second channel of the at least two channels and a level parameter (IID) describing a level difference between the first and the second channel as spatial parameters, the method comprising:

limiting the coherence parameter to derive a limited coherence parameter, wherein the limit of the coherence parameter depends on the level parameter and on a scaling factor; and deriving a reconstruction of the original audio signal from the downmix signal and the residual signal using an up-mixing rule depending on the limited coherence parameter.

35. Computer readable digital storage medium having stored thereon a computer program for performing, when running on a computer, a method for decoding an encoded audio signal representing an original audio signal having at least two channels, the encoded audio signal having a downmix signal, a residual signal as well as a coherence parameter describing a coherence between a first and a second channel of the at least two channels and a level parameter describing a level difference between the first and the second channel as spatial parameters, the method comprising:

limiting the coherence parameter to derive a limited coherence parameter, wherein the limit of the coherence parameter depends on the level parameter and on a scaling factor; and deriving a reconstruction of the original audio signal from the downmix signal and the residual signal using an up-mixing rule depending on the limited coherence parameter.

36. Computer readable digital storage medium having stored thereon a computer program for performing, when running on a computer, a method for encoding an audio signal having at least two channels, the method comprising:

deriving a coherence parameter (ICC) describing a coherence between a first and a second channel of the at least two channels and a level parameter (IID) describing a level difference between the first and the second channel as spatial parameters; limiting the coherence parameter to derive a limited coherence parameter, wherein the limit of the coherence parameter depends on the level parameter and on a scaling factor; and deriving a downmix signal and a residual signal from the audio signal using a down-mixing rule depending on the limited coherence parameter.

37. Computer readable digital storage medium having stored thereon a computer program for performing, when running on a computer, a method of transmitting or audio recording the method having a method of generating an encoded signal, the method comprising a method for encoding an audio signal having at least two channels, the method comprising:

deriving coherence parameter describing a coherence between a first and a second channel of the at least two channels and a level parameter describing a level difference between the first and the second channel as spatial parameters; limiting the coherence parameter to derive a limited coherence parameter, wherein the limit of the coherence parameter depends on the level parameter and on a scaling factor; and deriving a downmix signal and a residual signal from the audio signal using a down-mixing rule depending on the limited coherence parameter.

38. Computer readable digital storage medium having stored thereon a computer program for performing, when running on a computer, a method of receiving or audio playing, the method having a method for decoding an encoded audio signal representing an original audio signal having at least two channels, the encoded audio signal having a downmix signal, a residual signal as well as a coherence parameter (ICC) describing a coherence between a first and a second channel of the at least two channels and a level parameter (IID) describing a level difference between the first and the second channel as spatial parameters, the method comprising:

limiting the coherence parameter to derive a limited coherence parameter, wherein the limit of the coherence parameter depends on the level parameter and on a scaling factor; and deriving a reconstruction of the original audio signal from the downmix signal and the residual signal using an up-mixing rule depending on the limited coherence parameter.

39. Computer readable digital storage medium having stored thereon a computer program for performing, when running on a computer, a method of transmitting and receiving, the method including a transmitting method having a method of generating an encoded signal of an audio signal having at least two channels, comprising:

deriving a coherence parameter (ICC) describing a coherence between a first and a second channel of the at least two channels and a level parameter (IID) describing a level difference between the first and the second channel as spatial parameters; limiting the coherence parameter to derive a limited coherence parameter, wherein the limit of the coherence parameter depends on the level parameter and on a scaling factor; and deriving a downmix signal and a residual signal from the audio signal using a down-mixing rule depending on the limited coherence parameter; and the method of receiving comprising a method for decoding an encoded audio signal representing an original audio signal having at lest two channels, the encoded audio signal having a downmix signal, a residual signal as well as a coherence parameter (ICC) describing a coherence between a first and a second channel of the at least two channels and a level parameter (IID) describing a level difference between the first and the second channel as spatial parameters, the method comprising:

limiting the coherence parameter to derive a limited coherence parameter, wherein the limit of the coherence parameter depends on the level parameter and on a scaling factor; and deriving a reconstruction of the original audio signal from the downmix signal and the residual signal using an up-mixing rule depending on the limited coherence parameter.

* * * * *